US008094207B2

(12) United States Patent
Yoneyama

(10) Patent No.: US 8,094,207 B2
(45) Date of Patent: Jan. 10, 2012

(54) IMAGING SYSTEM, IMAGING APPARATUS, PORTABLE TERMINAL APPARATUS, ONBOARD APPARATUS, AND MEDICAL APPARATUS, AND METHOD OF MANUFACTURING THE IMAGING SYSTEM

(75) Inventor: Kazuya Yoneyama, Saitama (JP)

(73) Assignee: FujiFilm Corporation, Tokyo (JP)

(*) Notice: Subject to any disclaimer, the term of this patent is extended or adjusted under 35 U.S.C. 154(b) by 582 days.

(21) Appl. No.: 12/270,622

(22) Filed: Nov. 13, 2008

(65) Prior Publication Data

US 2009/0128655 A1 May 21, 2009

(30) Foreign Application Priority Data

Nov. 16, 2007 (JP) ................................ P2007-298144

(51) Int. Cl.
*H04N 5/235* (2006.01)

(52) U.S. Cl. .................................................... 348/222.1

(58) Field of Classification Search ........................ None
See application file for complete search history.

(56) References Cited

U.S. PATENT DOCUMENTS 5,307,175 A 4/1994 Seachman
6,545,714 B1 4/2003 Takada
6,902,273 B2 6/2005 Suzaki et al.
6,984,206 B2 1/2006 Kumei et al.
7,738,026 B2 6/2010 Cartlidge
2002/0118457 A1* 8/2002 Dowski, Jr. .................. 359/558
2003/0122926 A1* 7/2003 Kumei et al. .................. 348/65
2004/0165253 A1* 8/2004 Cathey et al. ................. 359/322
2004/0227822 A1 11/2004 Cartlidge et al.
2005/0204329 A1* 9/2005 Pauca et al. ..................... 716/21
2007/0268376 A1 11/2007 Yoshikawa et al.
2008/0007797 A1* 1/2008 Hayashi et al. ............... 358/474
2008/0239088 A1 10/2008 Yamashita
2009/0128654 A1 5/2009 Yoneyama
2009/0128655 A1 5/2009 Yoneyama
2009/0128665 A1 5/2009 Yoneyama
2009/0128668 A1 5/2009 Yoneyama
2009/0147097 A1 6/2009 Sato et al.
2009/0147124 A1 6/2009 Taniyama et al.
2009/0310000 A1 12/2009 Hosokawa et al.
2010/0074520 A1 3/2010 Kinoshita (Continued)

FOREIGN PATENT DOCUMENTS

JP 2004-328506 A 11/2004

(Continued)

*Primary Examiner* — David Ometz
*Assistant Examiner* — Dwight C Tejano
(74) *Attorney, Agent, or Firm* — Birch, Stewart, Kolasch & Birch, LLP

(57) ABSTRACT

An imaging system is provided and includes: an imaging lens; an imaging device; a coefficient storage section; and a signal processing section. When a maximum diameter of an effective region of a point image projected onto a light receiving surface of the imaging device through the imaging lens is a size covering three or more pixels, a restoration coefficient corresponding to a state of the point image expressed by first image data output from the imaging device is stored in the coefficient storage unit. The signal processing section executes restoration processing on the first image data output from the imaging device by utilizing the restoration coefficient stored in the coefficient storage unit, the restoration processing being executed to generate second image data equivalent to the first image data output from the imaging device when the resolving power of the imaging lens is higher.

14 Claims, 12 Drawing Sheets

U.S. PATENT DOCUMENTS

2010/0328477 A1 12/2010 Watanabe
2011/0032410 A1 2/2011 Shigemitsu et al.

FOREIGN PATENT DOCUMENTS

JP 2006-519527 A 8/2006
JP 2007-147951 A 6/2007
WO WO 99/67743 A1 12/1999
WO WO 2004/063989-42 7/2004
WO WO 2006/022373 A1 3/2006

* cited by examiner

IMAGING SYSTEM, IMAGING APPARATUS, PORTABLE TERMINAL APPARATUS, ONBOARD APPARATUS, AND MEDICAL APPARATUS, AND METHOD OF MANUFACTURING THE IMAGING SYSTEM

This application is based on and claims priority under 35 U.S.C §119 from Japanese Patent Application No. 2007-298144, filed on Nov. 16, 2007, the entire disclosure of which is herein incorporated by reference.

BACKGROUND OF THE INVENTION

1. Field of the Invention

The present invention relates to an imaging system capable of improving the quality of image data obtained by taking an optical image of a subject, an imaging apparatus including the imaging system, a portable terminal apparatus including the imaging system, an onboard apparatus including the imaging system, a medical apparatus including the imaging system, and a method for manufacturing the imaging system.

2. Description of Related Art

An imaging system is well known that forms an optical image of a subject through an imaging lens on a light receiving surface of an imaging device, such as a CCD or a CMOS device, having a set of two-dimensionally arrayed plurality of light receiving pixels.

As an example of such an imaging system, an onboard camera or a portable cellular phone camera having an imaging lens designed such that the depth of field increases is attached directly on a circuit board has already put to practical use (refer to JP-A-2007-147951). In addition, an onboard camera or a portable cellular phone camera with high performance is also known in which the number of pixels of an imaging device is increased so that the resolving power of an imaging system is improved. Among such onboard cameras or portable cellular phone cameras with high performance which are capable of obtaining high-resolution images, it is also known that the resolving power of an imaging system is already close to a diffraction limited.

However, in manufacturing an imaging system having such an imaging lens capable of forming a high resolution image, it is difficult to increase the yield due to difficulties in manufacture. This would cause a possibility that many imaging systems will be out of a production line for readjustment or reassembly since image data cannot be generated which allow an output image to have an intended resolution. In addition, an imaging system removed from the production line is reproduced such that image data can be generated in order to be capable of forming an image with an intended resolution after specifying the cause and modification accordingly.

However, there are various causes of reducing the output resolution from an imaging system. For example, various causes, such as shape errors (surface shape error, thickness error, and de-centering error of surfaces) of an individual lens used to form an imaging lens, assembly and adjustment errors of an imaging lens (shift error and tilt error of a lens and air space error between lenses), and a positional error of an imaging device with respect to an imaging lens, may be considered. For this reason, there is a problem that a cost would be significantly increased for reproduction in order for an imaging system to be capable of generating high-quality image data, which allows an output image to have an intended resolution, by specifying a cause of the reduction in resolution and performing readjustment and reassembly.

SUMMARY OF THE INVENTION

An object of an illustrative, non-limiting embodiment of the invention is to provide an imaging system capable of easily improving the quality of image data obtained by taking an optical image projected onto a light receiving surface, an imaging apparatus including the imaging system, a portable terminal apparatus including the imaging system, an onboard apparatus including the imaging system, a medical apparatus including the imaging system, and a method for manufacturing an imaging system.

According to an aspect of the invention, there is provided an imaging system including:

an imaging lens;

an imaging device that has a light receiving surface on which a plurality of light receiving pixels are two-dimensionally arrayed and that generates first image data as electrical signals an optical image of a subject projected onto the light receiving surface through the imaging lens and outputs first image data expressing the subject;

coefficient storage means for being configured to store a restoration coefficient corresponding to a state of a point image of the first image data output from the imaging device, when a maximum diameter of an effective region of the point image covers three or more pixels; and signal processing means for executing restoration processing on the first image data by utilizing the restoration coefficient stored in the coefficient storage means, the restoration processing being executed to generate second image data equivalent to a first image data output from the imaging device when a resolving power of the imaging lens is higher than the imaging lens, wherein the signal processing means executes the restoration processing in a minimum unit area of a pixel region covering total nine or more pixels indicating three or more pixels in a vertical direction and three or more pixels in a horizontal direction on the light receiving surface.

The “coefficient storage means being configured to store a restoration coefficient” means that the coefficient storage means will store a restoration coefficient.

The coefficient storage means may store the restoration coefficient individually calculated for each corresponding imaging system.

In addition, the coefficient storage means may be configured to store the restoration coefficient which is selected corresponding to a state of the point image expressed by the first image data among candidates of restoration coefficients corresponding to respective states of point images classified into a plurality of types.

In addition, the coefficient storage means may be configured to store a correction-completed restoration coefficient obtained by further correction of a restoration coefficient according to a state of the point image expressed by the first image data. A restoration coefficient is selected according to the state of the point image of the first image data among candidates of restoration coefficients corresponding to respective states of point images classified into a plurality of types.

The imaging system may further include restoration coefficient acquisition means for acquiring the restoration coefficient and storing the acquired restoration coefficient in the coefficient storage means.

The signal processing means may execute the restoration processing with a minimum pixel region, which includes the entire effective region of the point image projected onto the light receiving surface, as a minimum unit.

The signal processing means may execute the restoration processing such that the size of the effective region of the point image in an image expressed by the second image data is smaller than the size of the effective region of the point image in an image expressed by the first image data.

According to an aspect of the invention, there is provided an imaging apparatus including the imaging system described above.

According to an aspect of the invention, there is provided a portable terminal apparatus including the imaging system described above.

According to an aspect of the invention, there is provided an onboard apparatus including the imaging system described above.

According to an aspect of the invention, there is provided a medical apparatus including the imaging system described above.

According to an aspect of the invention, there is provided an imaging system including:

an imaging lens;

an imaging device that has a light receiving surface on which a plurality of light receiving pixels are two-dimensionally arrayed and that generates first image data as electrical signals an optical image of a subject projected onto the light receiving surface through the imaging lens and outputs first image data corresponding to the subject;

coefficient storage means storing a restoration coefficient corresponding to a state of a point image of the first image data output from the imaging device, when a maximum diameter of an effective region of the point image covers three or more pixels; and signal processing means for executing restoration processing on the first image data by utilizing the restoration coefficient stored in the coefficient storage means, the restoration processing being executed to generate second image data equivalent to a first image data output from the imaging device when a resolving power of the imaging lens is higher than the imaging lens, wherein the signal processing means executes the restoration processing in a minimum unit area of a pixel region covering total nine or more pixels indicating three or more pixels in a vertical direction and three or more pixels in a horizontal direction on the light receiving surface.

According to an aspect of the invention, there is provided a method for manufacturing an imaging system that includes:

an imaging lens;

an imaging device that has a light receiving surface on which a plurality of light receiving pixels are two-dimensionally arrayed and that generates first image data as electric signals on an optical image of a subject projected onto the light receiving surface through the imaging lens and outputs first image data corresponding to the subject;

coefficient storage means storing a restoration coefficient corresponding to a state of a point image of the first image data output from the imaging device, when a maximum diameter of an effective region of the point image covers three or more pixels; and signal processing means for executing restoration processing on the first image data by utilizing the restoration coefficient stored in the coefficient storage means, the restoration processing being executed to generate second image data equivalent to the first image data output from the imaging device when a resolving power of the imaging lens is higher than the imaging lens, wherein the signal processing means executes the restoration processing in a minimum unit are of a pixel region covering total nine or more pixels indicating three or more pixels in a vertical direction and three or more pixels in a horizontal direction on the light receiving surface, the method including projecting the point image onto the light receiving surface of the imaging device through the imaging lens to cause the coefficient storage means to store the restoration coefficient corresponding to a state of the point image expressed by the first image data output from the imaging device.

The restoration coefficient may be individually calculated for each corresponding imaging system.

The restoration coefficient may be selected corresponding to a state of the point image expressed by the first image data among candidates of each restoration coefficient corresponding to each of states of point images classified into a plurality of types.

In addition, the restoration coefficient may be obtained by further correction of a restoration coefficient according to a state of the point image expressed by the first image data. A restoration coefficient is selected according to the state of the point image of the first image data among candidates of restoration coefficients corresponding to respective states of point images classified into a plurality of types.

The maximum diameter of the effective region of the point image projected onto the light receiving surface may be assumed as a diameter of the effective region in a direction in which the effective region of the point image projected onto the light receiving surface includes a largest number of light receiving pixels, and "when the maximum diameter of the effective region of the point image projected onto the light receiving surface is a size covering three or more pixels" may be assumed as "when the effective region has a size covering three or more pixels of light receiving pixels in a direction in which the maximum diameter of the effective region of the point image projected onto the light receiving surface is a size covering three or more pixels".

The "effective region of a point image" means a region having a light intensity of $1/e^2$ (about 13.5%) of a peak intensity in the light intensity distribution indicating the point image.

In addition, image restoration processing disclosed in paragraphs (0002 to 0016) of JP-A-2000-123168 may be adopted as the "restoration processing". Moreover, in execution of the restoration processing, for example, a technique disclosed in Non-patent Document "title "Kernel Wiener Filter", Yoshikazu Washizawa and Yukihiko Yamashita, 2003 Workshop on Information-Based Induction Sciences, (IBIS2003), Kyoto, Japan, Nov. 11-12, 2003", which will be described, may be applied.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Figure 1:
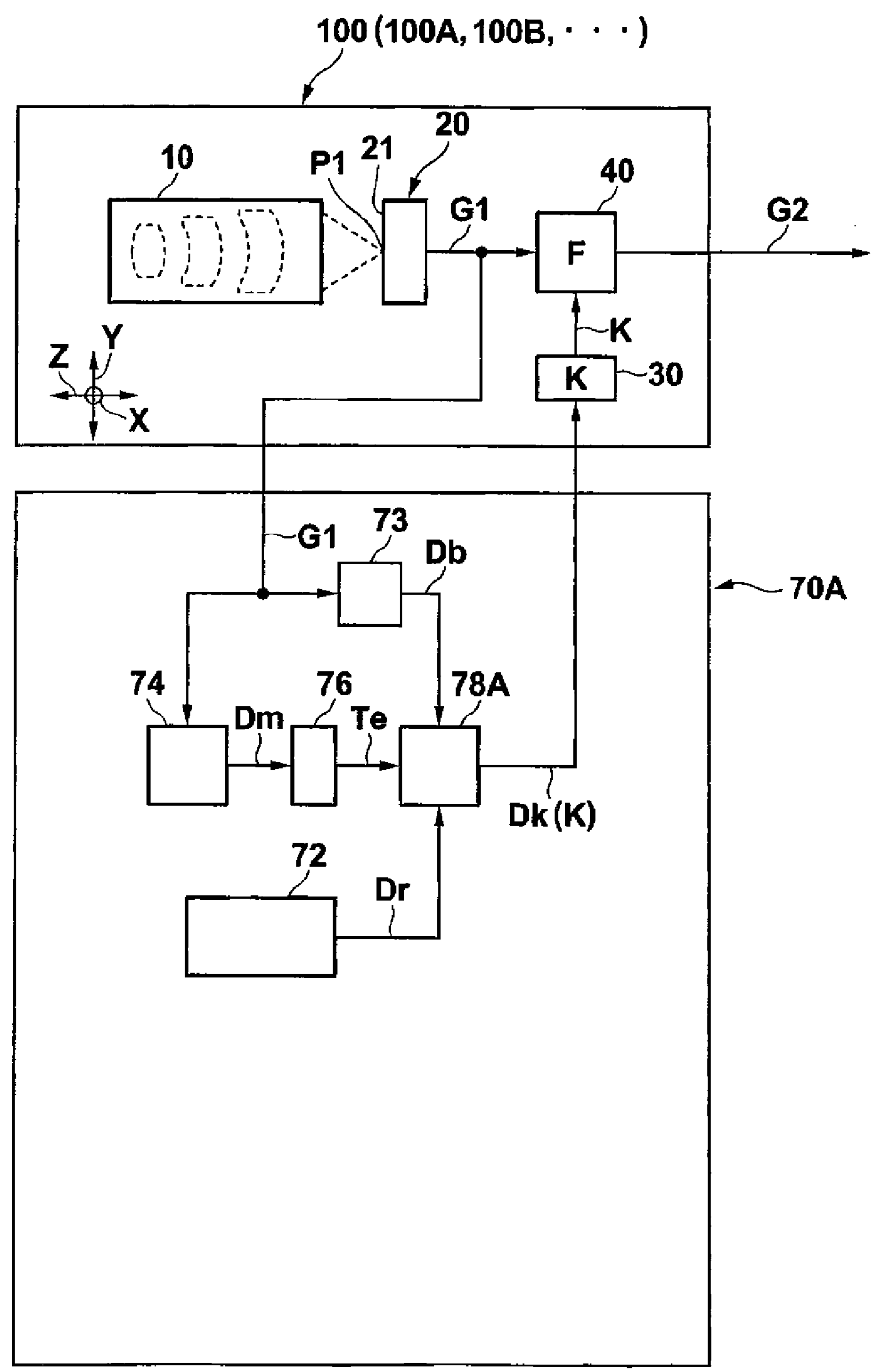
FIG. 1 is a block diagram showing a schematic configuration of an imaging system and a method for manufacturing an imaging system according to an exemplary embodiment of the invention.

An imaging system according to an first exemplary embodiment of the invention includes: coefficient storage means for being configured to store a restoration coefficient corresponding to a state (hereinafter, referred to as a blur state of a point image) of a point image of first image data, which is projected onto the light receiving surface through the imaging lens and is expressed by the first image data output from the imaging device, when the maximum diameter of the effective region of the point image is a size covering three or more pixels; and signal processing means for executing restoration processing on the first image data by utilizing the restoration coefficient in the coefficient storage means, the restoration processing being executed to generate the second image data equivalent to the first image data output from the imaging device when the resolving power of the imaging lens is higher. In addition, the signal processing means executes the restoration processing in a minimum unit area where the pixel region covering total nine or more pixels indicates three or more pixels in the vertical direction and three or more pixels in the horizontal direction on the light receiving surface. Accordingly, since the restoration processing using the restoration coefficient can be executed by storing the restoration coefficient in the coefficient storage means, the quality of image data obtained by imaging an optical image projected onto the light receiving surface can be easily improved.

That is, when the resolution of an image expressed by the first image data output from the imaging system does not reach an intended level, it is not necessary to specify the cause and readjust or reassemble the imaging lens unlike the related art. That is, the second image data that expresses an image having an intended resolution can be obtained only by storing a restoration coefficient corresponding to a blur state of a point image imaged in the imaging system in the coefficient storage means and performing restoration processing (image processing) on the first image data. As a result, the quality of image data obtained by taking an optical image projected onto the light receiving surface can be easily improved.

The reason why the "state of a point image" is called the "blur state of a point image" is that the image quality of a point image projected onto the light receiving surface through the imaging lens and the image quality of a point image expressed by the first image data obtained by imaging the point image deteriorate generally due to an influence of lens aberration and the like as compared with a subject which becomes an object point corresponding to the point image. That is, for example, assuming that a subject is a resolving power chart, the resolution of an image of the resolving power chart projected onto a light receiving surface through an imaging lens and the resolution of an image of the resolving chart expressed by the first image data obtained by imaging the image of the resolving power chart become always lower than the resolution of the resolving power chart itself. In addition, the "state of a point image" or the "blur state of a point image" mainly indicates a degradation state of the resolution of the point image.

Furthermore, when the coefficient storage means is made to store a restoration coefficient individually calculated for each corresponding imaging system, the restoration coefficient can be calculated more accurately and the restoration processing can be executed more accurately. Accordingly, the quality of image data obtained by imaging an optical image projected onto the light receiving surface can be improved more reliably.

In addition, when the coefficient storage means is made to store a restoration coefficient which is selected corresponding to a blur state of a point image expressed by the first image data among candidates of each restoration coefficient corresponding to each of blur states of point images classified into a plurality of types, the restoration coefficient can be set more easily compared with the case in which a restoration coefficient is individually calculated for each corresponding imaging system.

Here, when the coefficient storage means is made to store a correction-completed restoration coefficient obtained by further correction of a restoration coefficient, which is selected corresponding to a blur state of the point image expressed by the first image data among candidates of a plurality of types of restoration coefficients corresponding to each of blur states of point images classified into a plurality of types, according to a blur state of the point image, the restoration coefficient can be acquired more easily while suppressing a reduction in accuracy in calculating the restoration coefficient compared with the case in which a restoration coefficient is individually calculated for each corresponding imaging system.

Furthermore, when the imaging system is made to include the restoration coefficient acquisition means for acquiring the restoration coefficient and storing the acquired restoration coefficient in the coefficient storage means, the restoration coefficient can be acquired more reliably.

Furthermore, when the signal processing means is made to execute the restoration processing with a minimum pixel region, which includes the entire effective region of the point image projected onto the light receiving surface, as a minimum unit, it is possible to suppress an increase in operation time or power for executing the restoration processing and to efficiently execute the restoration processing.

Furthermore when the signal processing means is made to execute the restoration processing such that the size of the effective region of the point image in an image expressed by the second image data is smaller than the size of the effective region of the point image in an image expressed by the first image data, the quality of image data obtained by imaging an optical image projected onto the light receiving surface can be improved more reliably.

Each of the imaging apparatus, portable terminal apparatus, onboard apparatus, and medical apparatus of the invention includes the imaging system described above. Therefore, the quality of image data obtained by imaging an optical image projected onto a light receiving surface can be improved more reliably as described above.

An imaging system according to a second exemplary embodiment of the invention includes: coefficient storage means storing a restoration coefficient corresponding to a state of a point image of first image data, which is projected onto the light receiving surface through the imaging lens and is expressed by the first image data output from the imaging device, when the maximum diameter of the effective region of the point image is a size covering three or more pixels; and signal processing means for executing restoration processing on the first image data by utilizing the restoration coefficient in the coefficient storage means, the restoration processing being executed to generate the second image data equivalent to the first image data output from the imaging device when the resolving power of the imaging lens is higher. In addition, the signal processing means executes the restoration processing in a minimum unit area where the pixel region covering total nine or more pixels indicates three or more pixels in the vertical direction and three or more pixels in the horizontal direction on the light receiving surface. Accordingly, the quality of image data obtained by taking an optical image projected onto the light receiving surface can be easily improved, as in the above first embodiment.

According to a method for manufacturing an imaging system in an exemplary embodiment of the invention, the imaging system includes: coefficient storage means storing a restoration coefficient corresponding to a state of a point image of first image data, which is projected onto the light receiving surface through the imaging lens and is expressed by the first image data output from the imaging device, when the maximum diameter of the effective region of the point image is a size covering three or more pixels; and signal processing means for executing restoration processing on the first image data by using the restoration coefficient, the restoration processing being executed to generate the second image data equivalent to the first image data output from the imaging device when the resolving power of the imaging lens is larger, and the signal processing means executes the restoration processing in a minimum unit area where the pixel region covering total nine or more pixels indicates three or more pixels in the vertical direction and three or more pixels in the horizontal direction on the light receiving surface. Further, the point image is projected onto the light receiving surface of the imaging device through the imaging lens, and a restoration coefficient corresponding to a state of the point image expressed by the first image data output from the imaging device is stored in the coefficient storage means. Accordingly, the second imaging system can be manufactured efficiently.

For example, even if the resolving power of an image expressed by image data output from the imaging system does not reach an intended level due to a manufacturing problem, reproduction processing of the imaging system for increasing the resolving power of an image can be easily executed compared with that in the relate art. That is, since restoration processing for increasing the quality of image data output from the imaging system can be easily executed by the imaging system in which a restoration coefficient is stored in the coefficient storage means, an imaging system in which the resolving power of an image does not reach an intended level can be reproduced to one in which the resolving power of an image with the intended level can be easily obtained. Accordingly, an imaging system can be manufactured efficiently.

In addition, in the case when the imaging system is produced in large quantities, a larger effect of manufacturing the imaging system can be efficiently obtained.

Hereinafter, exemplary embodiments of the invention will be described with reference to the accompanying drawings. FIG. 1 is a block diagram showing the schematic configuration of an imaging system and a method for manufacturing an imaging system according to an exemplary embodiment of the invention.

<Configuration of an Imaging System>

Hereinafter, the configuration of an imaging system will be described.

An imaging system 100 shown in FIG. 1 includes: an imaging lens 10; an imaging device 20 which has a light receiving surface 21 on which a plurality of light receiving pixels are two-dimensionally arrayed and which images an optical image P1 of a subject projected onto the light receiving surface 21 through the imaging lens 10 and outputs first image data G1 expressing the subject; a coefficient storage unit 30 that stores a restoration coefficient K corresponding to a blur state of the point image P1, indicated by the first image data G1 output from the imaging device 20, when the maximum diameter of an effective region of the point image projected onto the light receiving surface 21 through the imaging lens 10 is a size covering three or more pixels; and a signal processing unit 40 that executes restoration processing F on the first image data G1 using the restoration coefficient K stored in the coefficient storage unit 30, the restoration processing F being executed to generate second image data G2 equivalent to the first image data G1 output from the imaging device 20 when the resolving power of the imaging lens 10 is high.

The signal processing unit 40 executes the restoration processing F in a condition where a pixel region covering total nine or more pixels including three or more pixels in a vertical direction and three or more pixels in a horizontal direction on the light receiving surface 21 is set as a minimum unit.

Here, the maximum diameter of the effective region of the point image P1 projected onto the light receiving surface 21 is a diameter of the effective region in a direction in which the effective region of the point image P1 projected onto the light receiving surface 21 includes a largest number of light receiving pixels.

In addition, a direction indicated by arrow Z in FIG. 1 is a direction of an optical axis of the imaging lens 10, and directions indicated by arrows X and Y are directions parallel to the light receiving surface 21.

Here, a restoration coefficient acquisition apparatus 70A provided outside the imaging system 100 acquires the restoration coefficient K corresponding to a blur state of the point image P1 expressed by the first image data G1 output from the imaging device 20 and makes the restoration coefficient K in the coefficient storage unit 30.

The restoration coefficient acquisition apparatus 70A includes: an ideal point image storage unit 72 that stores data Dr, which is either design data regarding a point image when there is no error in an optical system including the imaging lens 10 or ideal point image state data regarding an ideal point image state exceeding it, beforehand; a point image blur state acquisition unit 73 that analyzes a blur state of a point image expressed by the first image data G1 output from the imaging device 20 and acquires blurred point image state data Db indicating the analysis result; a point image diameter acquisition unit 74 that acquires the maximum diameter of an effective region of the point image P1 projected onto the light receiving surface 21 through the imaging lens 10; a determination unit 76 that determines whether or not the maximum diameter obtained in the point image diameter acquisition unit 74 is a size covering three or more pixels on the light receiving surface 21; and a restoration coefficient acquisition unit 78A that is input with the blurred point image state data Db output from the point image blur state acquisition unit 73 and the data Dr which is design data or ideal point image state data stored in the ideal point image storage unit 72, acquires coefficient data Dk indicating the restoration coefficient K corresponding to the blur state of the point image P1 expressed by the first image data G1 by an operation using both the blurred point image state data Db and the data Dr, and makes the restoration coefficient K indicated by the coefficient data Dk stored in the coefficient storage unit 30 when the determination unit 76 determines that the maximum diameter is a size covering three or more pixels on the light receiving surface 21.

In addition, an imaging lens used in the imaging system of the invention may be adopted even if an optical image is "not focused" correctly on a light receiving surface through the imaging lens without being limited to a case where the optical image is "focused" correctly on the light receiving surface necessarily through the imaging lens. Therefore, in the invention, an explanation will be made assuming that an optical image is "projected" on a light receiving surface through an imaging lens. The state "not focused" is considered as a so-called blurred image. For example, a state where a point image wider than an original point image due to a manufacturing error is generated or a situation where designed point image is already larger than that of a point image to be originally intended due to design constraint (size or cost of an optical system) is also included.

In addition, the blurred point image state data Db mainly indicating a degradation state of the resolution of a point image as described above may be set to indicate the size of an effective region of the point image P1 or the brightness distribution (concentration distribution of an image) on the light receiving surface of the point image P1, for example.

<Operation of an Imaging System>

Next, an operation of the above imaging system will be described.

First, an example of a case where a restoration coefficient is calculated by a restoration coefficient acquisition apparatus and the restoration coefficient is stored in a coefficient storage unit will be described.

An optical image of a subject projected onto the light receiving surface 21 through the imaging lens 10 is imaged by the imaging device 20, and the first image data G1 indicating the subject output from the imaging device 20 are input to the point image blur state acquisition unit 73 and the point image diameter acquisition unit 74.

The point image blur state acquisition unit 73 to which the first image data G1 is input analyzes a blur state of a point image expressed by the first image data G1 and outputs the analysis result to the blurred point image state data Db.

In addition, the point image diameter acquisition unit 74 to which the first image data G1 is input calculates the maximum diameter of the effective region of the point image P1 projected onto the light receiving surface 21 and outputs diameter data Dm indicating the maximum diameter. The determination unit 76 to which the diameter data Dm indicating the maximum diameter is input determines whether or not the maximum diameter of the effective region of the point image P1 is a size covering three or more pixels on the light receiving surface 21 and outputs a signal Te when it is determined that the maximum diameter is a size covering three or more pixels.

The restoration coefficient acquisition unit 78A input with the signal Te is input with the blurred point image state data Db output from the point image blur state acquisition unit 73 and the data Dr which is design data or ideal point image state data stored beforehand in the ideal point image storage unit 72, acquires the restoration coefficient K corresponding to the blur state of the point image P1 by an operation using both the blurred point image state data Db and the data Dr, and outputs the coefficient data Dk indicating the restoration coefficient K.

The coefficient data Dk output from the restoration coefficient acquisition unit 78A is input to the coefficient storage unit 30, such that the restoration coefficient K indicated by the coefficient data Dk is stored in the coefficient storage unit 30.

In addition, a DxO analyzer made by DxO Labs (France), which will be described later, is mentioned as an example of realizing functions of the point image blur state acquisition unit 73 and point image diameter acquisition unit 74. In the DxO analyzer, a blur state (degradation state of the resolution) of the point image P1 projected onto the light receiving surface 21 or the maximum diameter of the effective region may be acquired by analyzing the first image data G1 output from the imaging device 20.

The restoration coefficient K is stored in the coefficient storage unit 30 as described above, resulting in a state where the imaging system 100 can execute restoration processing.

<Restoration Processing>

A case in which second image data that expresses an image with higher resolution than an image expressed by first image data is acquired by executing the restoration processing F on the first image data output from the imaging device 20 using the restoration coefficient K stored in the coefficient storage unit 30 will be described. Moreover, in the following explanation, a case in which the restoration processing F is mainly performed on the first image data expressing a point image will be described.

Figure 2A:
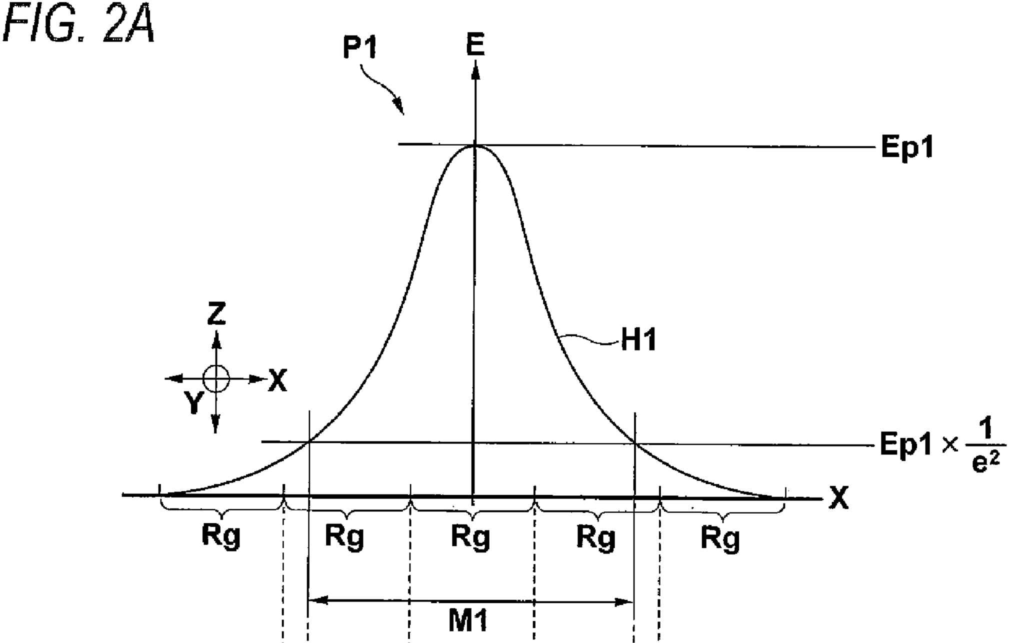
FIG. 2A is a view showing the light intensity distribution of a point image.
Figure 2B:
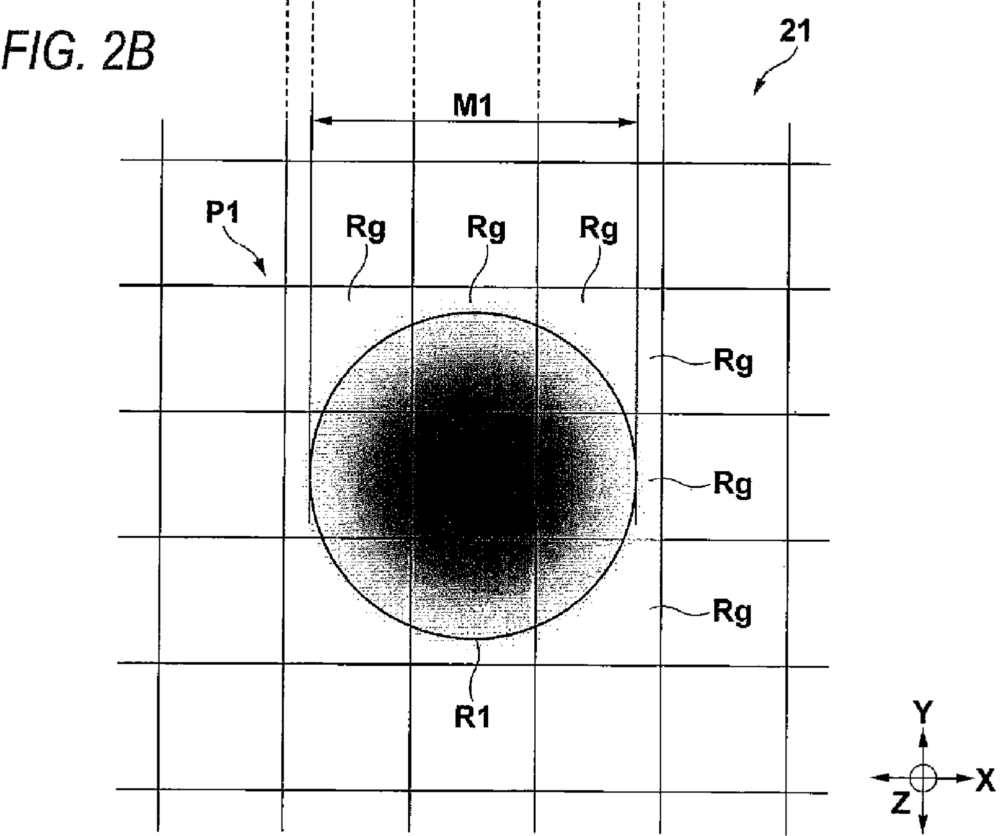
FIG. 2B is a view showing a point image projected onto a light receiving surface.
Figure 3A:
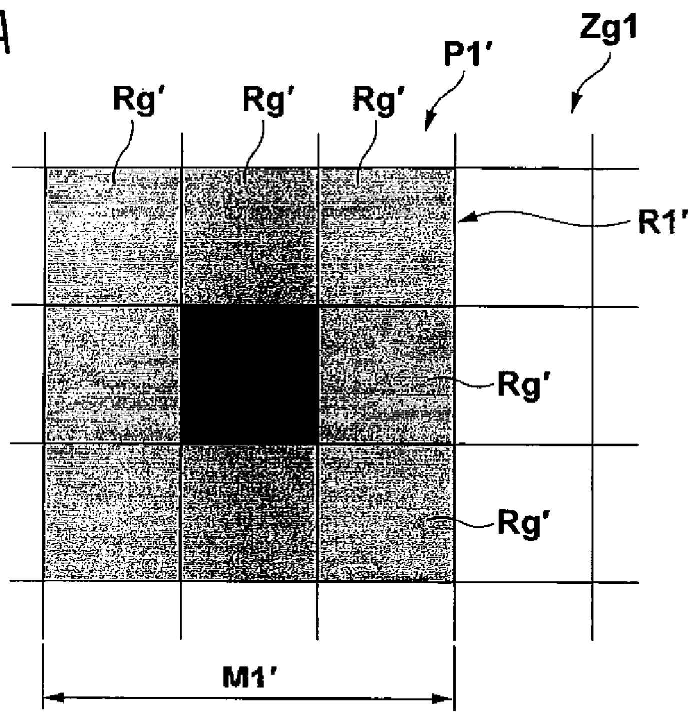
FIG. 3A is a view showing an image of a point image displayed in an image expressed by first image data.
Figure 3B:
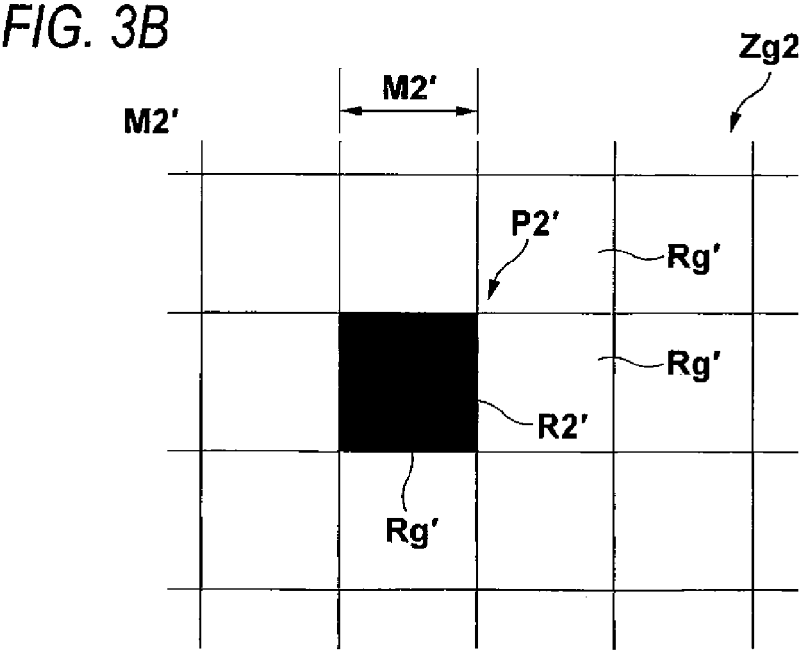
FIG. 3B is a view showing an image of a point image displayed in an image expressed by second image data.

FIG. 2A is a view showing the light intensity distribution of a point image on the coordinates in which a vertical axis indicates a light intensity E and a horizontal axis indicates an X-direction position on a light receiving surface. FIG. 2B is a view showing each pixel region (denoted by reference numeral Rg in the drawing) of a light receiving pixel, which forms a light receiving surface, and a point image projected onto the light receiving surface on the coordinates in which a vertical axis indicates a Y-direction position on the light receiving surface and a horizontal axis indicates an X-direction position on the light receiving surface. FIG. 3A is a view showing an image of a point image displayed in an image expressed by the first image data, and FIG. 3B is a view showing an image of a point image displayed in an image expressed by the second image data. In addition, the sizes of pixel regions (denoted by reference numeral Rg" in the drawing) of the images shown in FIGS. 3A and 3B are equal. In addition, each pixel region Rg of a light receiving pixel that forms the light receiving surface 21 and the pixel region Rg" of an image expressed by the first image data G1 or the second image data G2 are regions corresponding to each other.

Figure 4A:
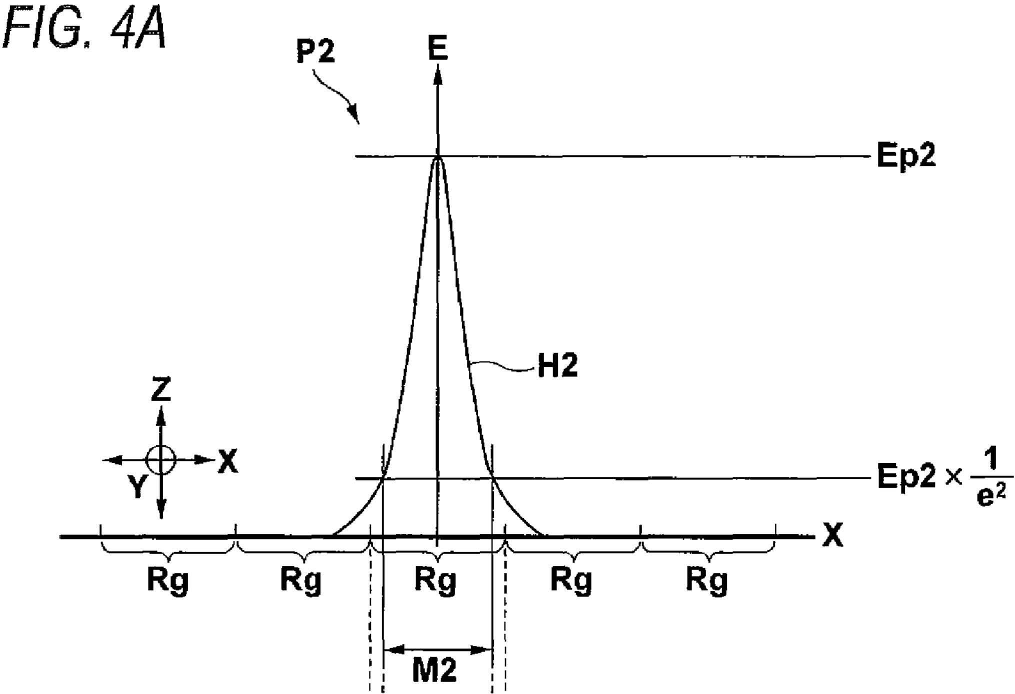
FIG. 4A is a view showing the light intensity distribution of a point image to be projected onto a light receiving surface when the resolving power of an imaging lens is higher.
Figure 4B:
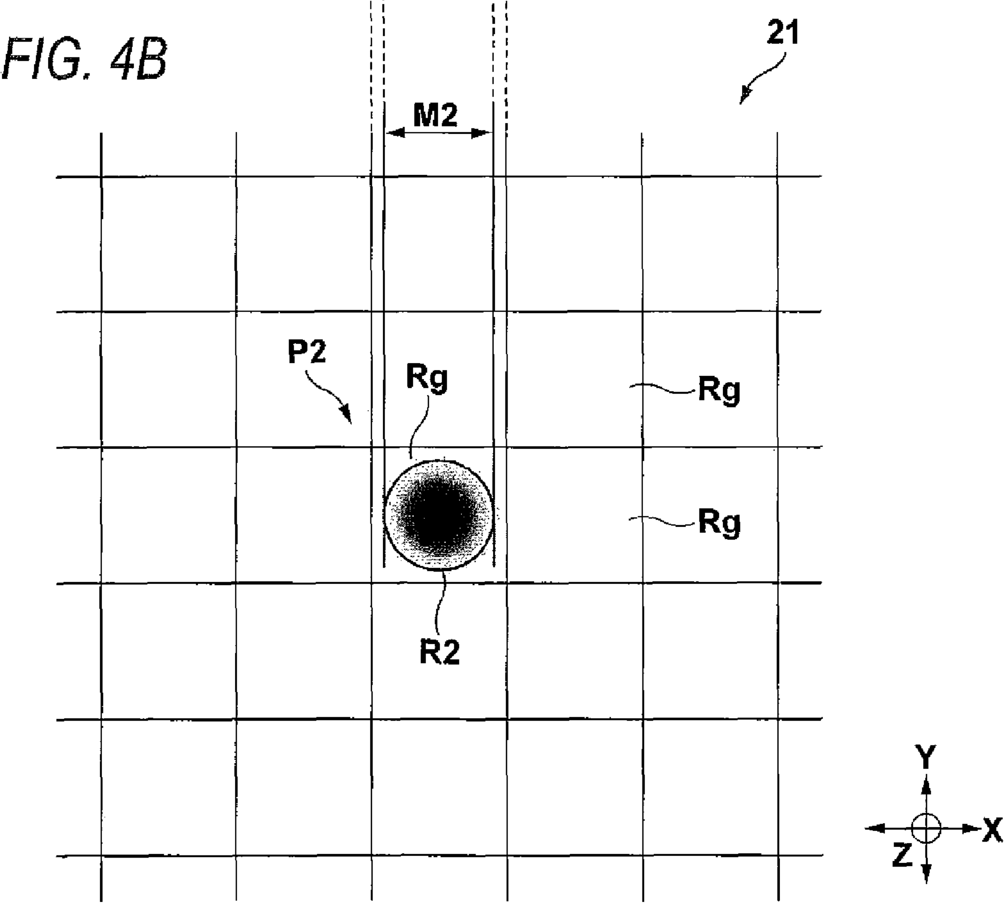
FIG. 4B is a view showing each pixel region of a light receiving pixel that forms a light receiving surface and a point image to be projected onto the light receiving surface when the resolving power of the imaging lens is higher.

In addition, FIG. 4A is a view showing the light intensity distribution of a point image, which is to be projected onto the light receiving surface 21 when the resolving power of the imaging lens 10 is high, on the coordinates in which a vertical axis indicates the light intensity E and a horizontal axis indicates the X-direction position on the light receiving surface. In addition, this may be regarded as indicating an ideal point image state regardless of an optical system. FIG. 4B is a view showing each pixel region (denoted by reference numeral Rg in the drawing) of a light receiving pixel, which forms the light receiving surface, and a point image P2, which is to be projected onto the light receiving surface 21 when the resolving power of the imaging lens 10 is high, on the coordinates in which the vertical axis indicates the Y-direction position on the light receiving surface and the horizontal axis indicates the X-direction position on the light receiving surface.

A maximum diameter M1 of an effective region R1 of the point image P1 which is an optical image projected onto the light receiving surface 21 through the imaging lens 10 is a size covering three continuous pixels of light receiving pixels that form the light receiving surface 21, as shown in FIG. 2B. In addition, the effective region R1 is a region covering total nine pixels including three pixels in the vertical direction and three pixels in the horizontal direction on the light receiving surface 21. That is, the effective region R1 is a region occupying nine pixels (3 pixels×3 pixels) of light receiving pixels that form the light receiving surface 21.

In addition, as shown in FIG. 2A, the effective region R1 of the point image P1 is a region having a light intensity of $1/e^2$ or more of a peak intensity Ep1 on a light intensity distribution H1 indicating the point image P1.

The point image P1 projected onto the light receiving surface 21 is imaged by the imaging device 20, and the first image data G1 expressing this point image P1 is output from the imaging device 20.

As shown in FIG. 3A, an image P1" corresponding to the point image P1 displayed in an image Zg1 indicated by the first image data G1 is displayed with an effective region R1" of the image P1" covering nine pixels (3 pixels×3 pixels) of the image with no change.

Then, the signal processing unit 40 to which the image data G1 is input executes the restoration processing F on the first image data G1 using a restoration coefficient K1, obtaining the second image data G2.

As shown in FIGS. 3A and 3B, an effective region R2" of an image P2" of a point image in an image Zg2 indicated by the second image data G2 corresponding to the image P1" of the point image expressed by the first image data G1 is smaller than the effective region R1" of the image P1" of the point image in the image Zg1 indicated by the first image data G1. Accordingly, a maximum diameter M2" (region corresponding to three pixels of the pixel region Rg") of the image P2" of the point image displayed in the image Zg2 becomes also smaller than a maximum diameter M1" (region corresponding to one pixel of the pixel region Rg") of the image P1" of the point image displayed in the image Zg1.

That is, the image P2" of the point image expressed by the second image data G2 shown in FIG. 3B and an image of a point image expressed by the first image data output from the imaging device 20 which has imaged the point image P2 (refer to FIG. 4) to be projected onto the light receiving surface 21 when the resolving power of the imaging lens 10 is high become equal images.

More specifically, the image P2" (refer to FIG. 3B) of the point image expressed by the second image data G2 obtained by executing the restoration processing F on the first image data G1, which is output from the imaging device 20 that has imaged the point image P1 (refer to FIGS. 2A and 2B) which is projected onto the light receiving surface 21 through the imaging lens 10 and whose effective region R1 covers nine pixels, using the restoration coefficient K and an image of a point image expressed by the first image data G1 output from the imaging device 20 which has imaged the point image P2 (the maximum diameter M2 of the effective region R1 is included in one pixel region Rg; refer to FIGS. 4A and 4B), which is expected to be projected onto the light receiving surface 21 when the resolving power of the imaging lens 10 is high, are equal images.

In addition, the effective region R2 of the point image P2 included in one pixel region Rg on the light receiving surface 21 shown in FIGS. 4A and 4B is a region having a light intensity of $1/e^2$ or more of a peak intensity Ep2 on a light intensity distribution H2 indicating the point image P2, similar to the case of the point image P1. Here, the effective region R2 of the point image P2 has a size included in one pixel region Rg.

Thus, the resolution of an image expressed by the second image data obtained by performing restoration processing on the first image data may be higher than that of the image expressed by the first image data.

In addition, since the same image as an image obtained when the depth of field of the imaging lens 10 is made large can be obtained by the restoration processing F, it can be said that the restoration processing makes the depth of field of the imaging lens 10 substantially large.

For example, image restoration processing disclosed in paragraphs ([0002] to [0016]) of JP-A-2000-123168 may be adopted as the restoration processing F of the signal processing unit 40 using the restoration coefficient K corresponding to a state of the point image P1 expressed by the first image data G1.

Although a case of imaging a point image has been described, an optical image of a subject projected onto the light receiving surface 21 through the imaging lens 10 is regarded as a group of point images expressing the subject. Therefore, even if any subject is imaged, the second image data expressing an image can be generated with resolution higher than the image expressed by the first image data by performing restoration processing on the first image data.

<Modification of a Restoration Coefficient Acquisition Apparatus>

Hereinafter, a modification of the restoration coefficient acquisition apparatus will be described.

The restoration coefficient acquisition apparatus which makes the restoration coefficient K1 or K1', which corresponds to a blur state of a point image expressed by the first image data output from the imaging device, stored in the coefficient storage unit 30 may be constructed like a restoration coefficient acquisition apparatus 70B of a second example and a restoration coefficient acquisition apparatus 70C of a third example, respectively, which will be described below and are different from the restoration coefficient acquisition apparatus 70A in the first example.

Figure 5:
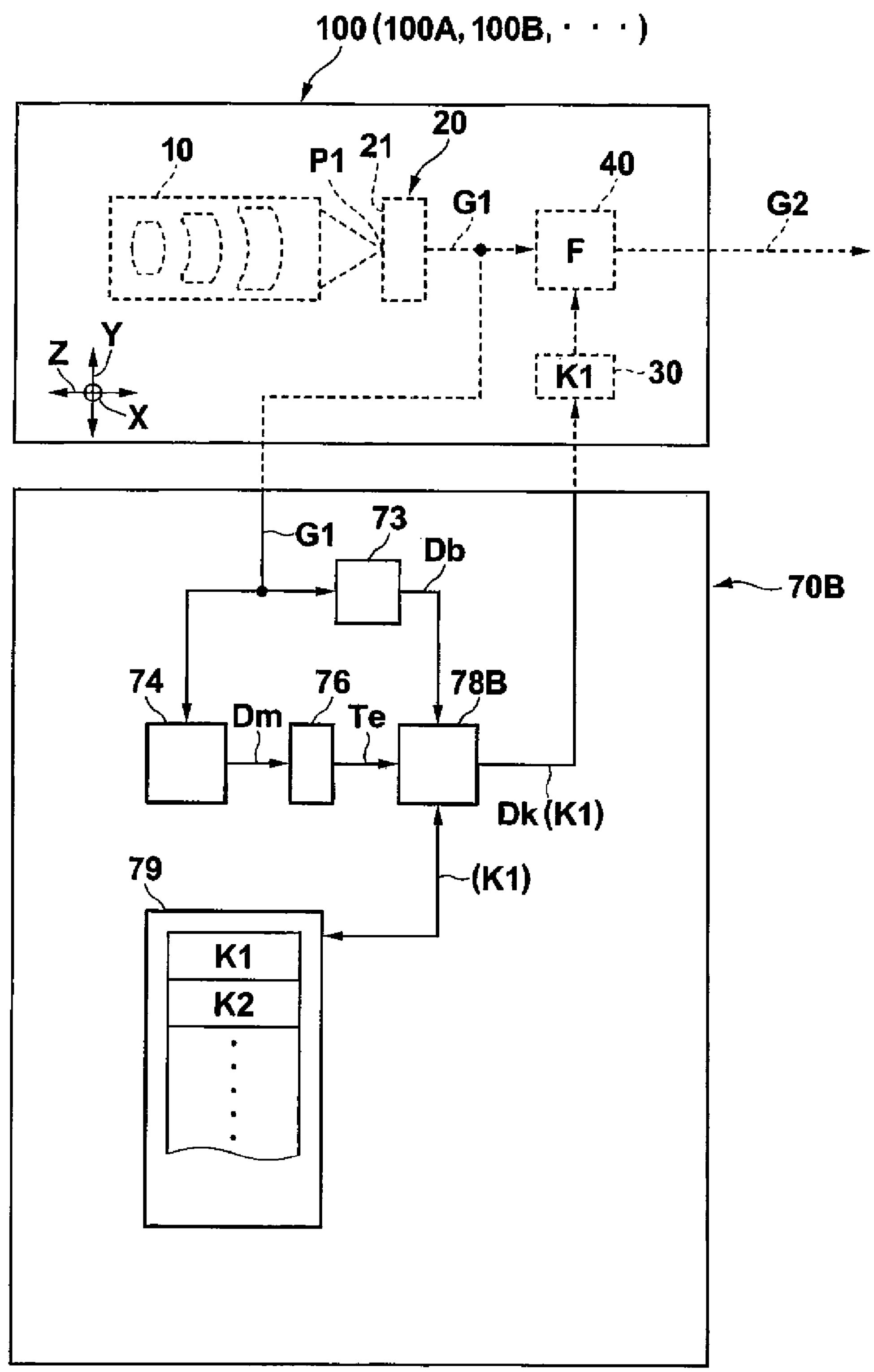
FIG. 5 is view showing a restoration coefficient acquisition apparatus in a second example.
Figure 6:
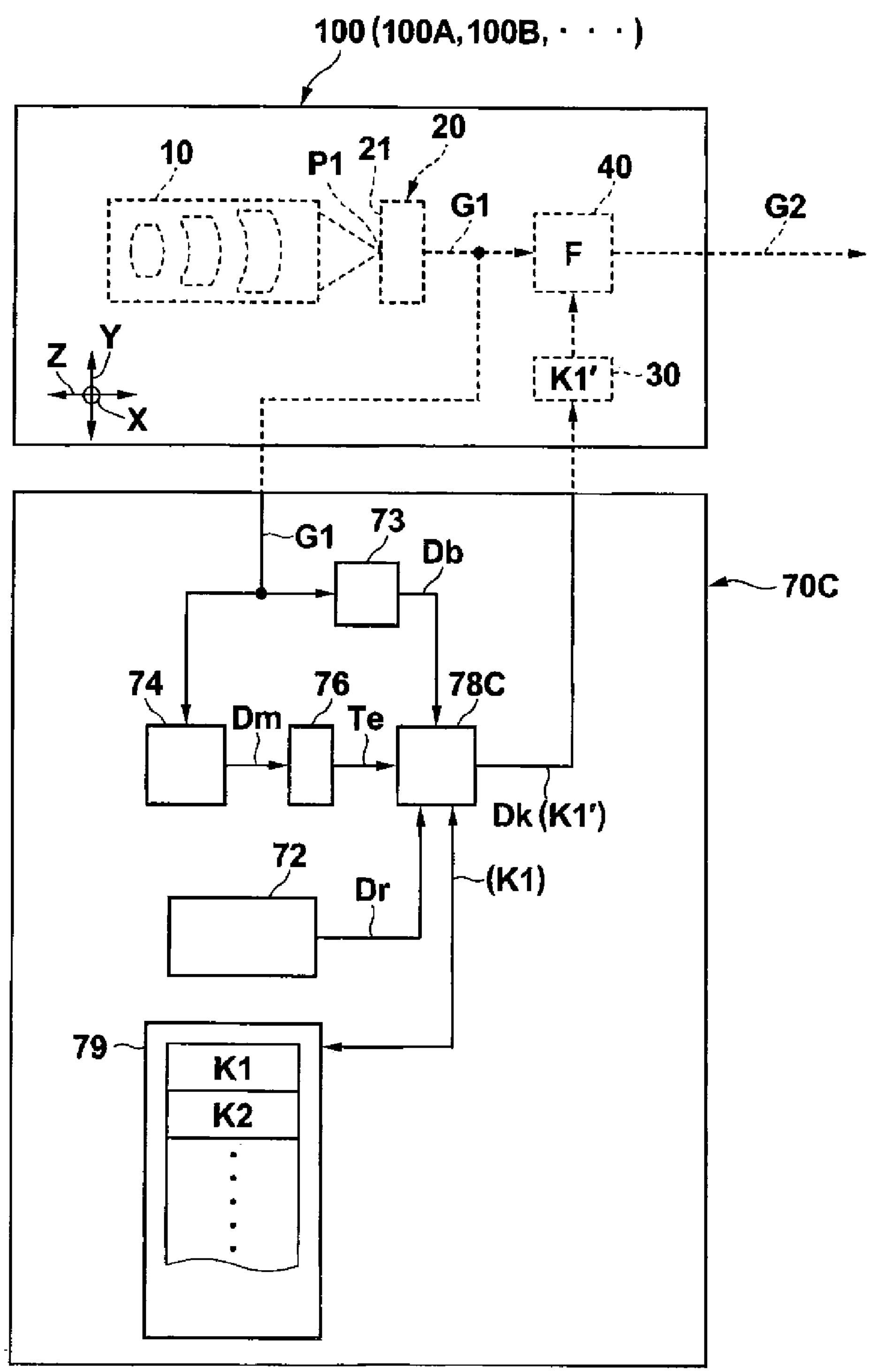
FIG. 6 is view showing a restoration coefficient acquisition apparatus in a third example.
Figure 7:
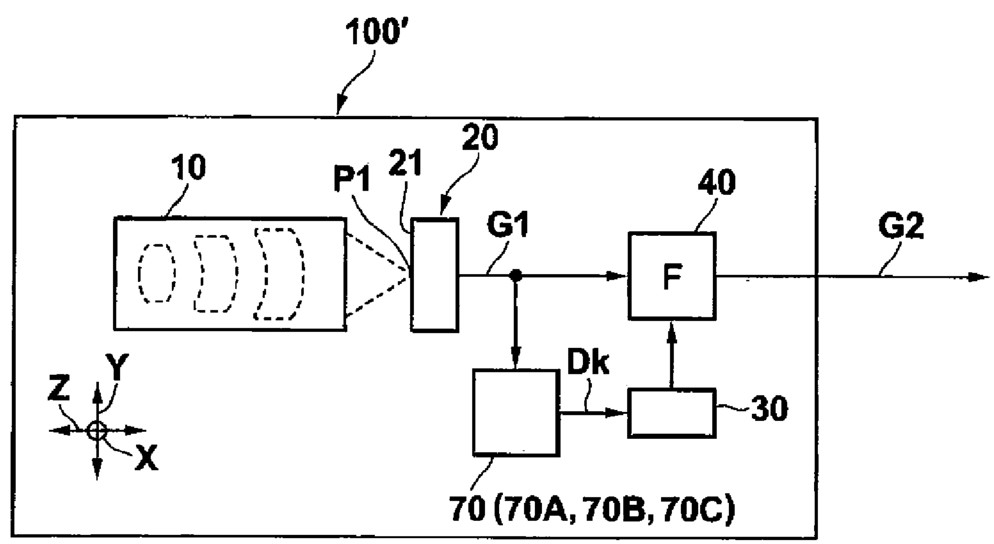
FIG. 7 is a view showing an imaging system including a restoration coefficient acquisition apparatus.
Figure 8:
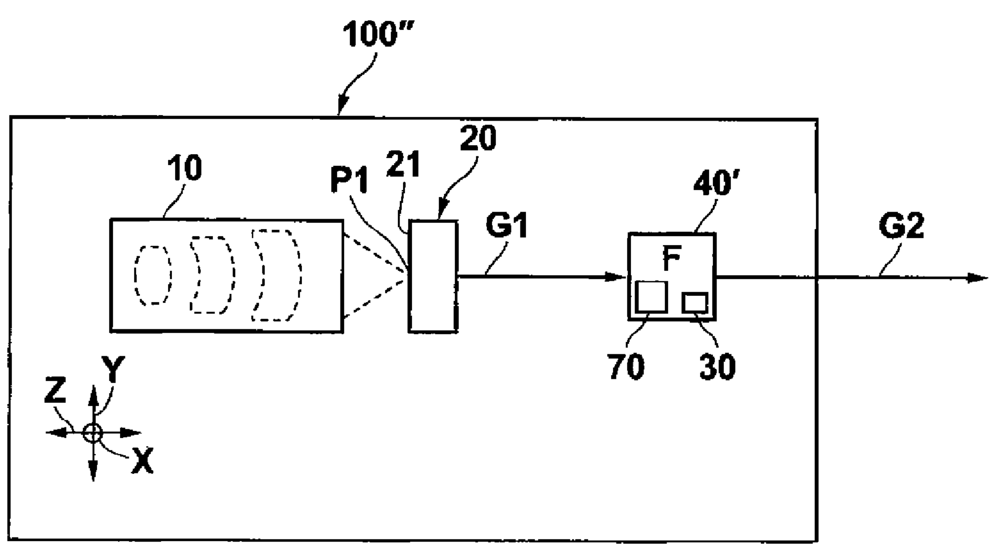
FIG. 8 is a view showing an imaging system including a signal processing unit that has a restoration coefficient acquisition apparatus and a coefficient storage unit.

FIG. 5 is a view showing the restoration coefficient acquisition apparatus 70B of the second example, and FIG. 6 is a view showing the restoration coefficient acquisition apparatus 70C of the third example. FIG. 7 is a view showing an imaging system including a restoration coefficient acquisition apparatus, and FIG. 8 is a view showing an imaging system including a signal processing unit that has a restoration coefficient acquisition apparatus and a coefficient storage unit. Moreover, in FIGS. 5 to 8, constituent components having the same functions as the restoration coefficient acquisition apparatus 70A of the first example are denoted by the same reference numerals as in the case of the restoration coefficient acquisition apparatus 70A of the first example.

As shown in FIG. 5, the restoration coefficient acquisition apparatus 70B of the second example includes: a candidate coefficient storage unit 79 that stores candidates K1, K2, . . . of each restoration coefficient corresponding to each of blur states of point images classified into a plurality of types beforehand; a point image blur state acquisition unit 73 that analyzes a blur state of a point image expressed by the first image data G1 output from the imaging device 20, acquires blurred point image state data Db indicating the analysis result, and outputs the blurred point image state data Db to a restoration coefficient acquisition unit 78B to be described later; a point image diameter acquisition unit 74 that acquires the maximum diameter of an effective region of the point image P1 projected onto the light receiving surface 21 through the imaging lens 10; a determination unit 76 that determines whether or not the maximum diameter obtained in the point image diameter acquisition unit 74 is a size covering three or more pixels on the light receiving surface 21; and the restoration coefficient acquisition unit 78B that selects a restoration coefficient (for example, K1), which corresponds or is considered to as closest to a blur state of the point image P1 expressed by the blurred point image state data Db, among the restoration coefficient candidates K1, K2, . . . and makes the restoration coefficient K1 stored in the coefficient storage unit 30 when the determination unit 76 determines that the maximum diameter is a size covering three or more pixels on the light receiving surface 21.

In the restoration coefficient acquisition apparatus 70B, the point image diameter acquisition unit 74 acquires the maximum diameter of the effective region of the point image P1 projected onto the light receiving surface 21 through the imaging lens 10 and outputs diameter data Dm indicating the maximum diameter to the determination unit 76. The determination unit 76 to which the diameter data Dm is input determines whether or not the maximum diameter is a size covering three or more pixels on the light receiving surface 21 and outputs a signal Te, which indicates that the maximum diameter is a size covering three or more pixels, to the restoration coefficient acquisition unit 78B when it is determined that the maximum diameter is a size covering three or more pixels. The restoration coefficient acquisition unit 78B to which the signal Te is input selects a restoration coefficient (for example, K1), which corresponds or is considered as closest to a blur state of the point image P1 expressed by the blurred point image state data Db, among the restoration coefficient candidates K1, K2, . . . stored in the candidate coefficient storage unit 79 and outputs coefficient data Dk indicating the restoration coefficient K1 to the coefficient storage unit 30 such that the coefficient data Dk is stored in the coefficient storage unit 30.

That is, a restoration coefficient (for example, K1) is stored in the coefficient unit 30 as mostly preferable coefficient that is selected corresponding or is considered as closest to a blur state of a point image expressed by the first image data G1 among the candidates K1, K2, . . . of each restoration coefficient corresponding to each of blur states of point images classified into a plurality of types.

On the other hand, as shown in FIG. 6, the restoration coefficient acquisition apparatus 70C of the third example includes: a candidate coefficient storage unit 79 that stores candidates K1, K2, . . . of each restoration coefficient corresponding to each of blur states of point images classified into a plurality of types beforehand; an ideal point image storage unit 72 that stores data Dr, which is either ideal point image state data or design data regarding an ideal point image projected onto the light receiving surface 21 through an imaging lens with high resolving power, beforehand when the resolving power of the imaging lens 10 is high; a point image blur state acquisition unit 73 that analyzes a blur state of a point image expressed by the first image data G1 output from the imaging device 20, acquires blurred point image state data Db indicating the analysis result, and outputs the blurred point image state data Db to a restoration coefficient acquisition unit 78C to be described later; a point image diameter acquisition unit 74 that acquires the maximum diameter of an effective region of the point image P1 projected onto the light receiving surface 21 through the imaging lens 10; and a determination unit 76 that determines whether or not the maximum diameter obtained in the point image diameter acquisition unit 74 is a size covering three or more pixels on the light receiving surface 21.

In addition, the restoration coefficient acquisition apparatus 70C includes the restoration coefficient acquisition unit 78C that selects a restoration coefficient (for example, K1), which corresponds or is considered as closest to a blur state of the point image P1 expressed by the blurred point image state data Db output from the point image blur state acquisition unit 73, among the restoration coefficient candidates K1, K2, . . . , acquires coefficient data Dk (K1") indicating a correction-completed restoration coefficient K1" obtained by further correction of the restoration coefficient K1 by an operation using the blurred point image state data Db and the data Dr which is ideal point image state data or design data of a point image stored beforehand in the ideal point image storage unit 72, and makes the correction-completed restoration coefficient K1" indicated by the coefficient data Dk (K1") stored in the coefficient storage unit 30 when the determination unit 76 determines that the maximum diameter is a size covering three or more pixels on the light receiving surface 21.

In the restoration coefficient acquisition apparatus 70C, the point image diameter acquisition unit 74 acquires the maximum diameter of the effective region of the point image P1 projected onto the light receiving surface 21 through the imaging lens 10 and outputs diameter data Dm indicating the maximum diameter to the determination unit 76. The determination unit 76 to which the diameter data Dm is input determines whether or not the maximum diameter is a size covering three or more pixels on the light receiving surface 21 and outputs a signal Te, which indicates that the maximum diameter is a size covering three or more pixels, to the restoration coefficient acquisition unit 78C when it is determined that the maximum diameter is a size covering three or more pixels. The restoration coefficient acquisition unit 78C to which the signal Te is input selects a restoration coefficient (for example, K1), which corresponds or is considered as closest to a blur state of the point image P1 expressed by the blurred point image state data Db, among the restoration coefficient candidates K1, K2, . . . stored in the candidate coefficient storage unit 79, acquires correction-completed restoration coefficient K1" obtained by further correction of the restoration coefficient K1 by an operation using the blurred point image state data Db and the data Dr which is ideal point image state data or design data of a point image stored beforehand in the ideal point image storage unit 72, and makes the correction-completed restoration coefficient K1" stored in the coefficient storage unit 30.

That is, the correction-completed restoration coefficient K1" obtained by further correction of a restoration coefficient (for example, K1), which is selected corresponding or being considered as closest to a blur state of the point image P1 expressed by the first image data G1 among a plurality of types of restoration coefficient candidates corresponding to each of blur states of point images classified into a plurality of types, according to the blur state of the point image is stored in the coefficient storage unit 30.

In addition, the imaging system 100 may include the restoration coefficient acquisition apparatus 70A, 70B, or 70C as a part thereof. Or the imaging system 100 may not include any of the restoration coefficient acquisition apparatuses 70A, 70B, and 70C because once any of restoration coefficients is stored in the coefficient storage unit 30, the imaging system 100 can work in proper way.

In addition, an imaging system 100' shown in FIG. 7 includes a restoration coefficient acquisition apparatus 70, which has the same function as the restoration coefficient acquisition apparatus 70A, 70B, or 70C, provided in a housing of the imaging system. The imaging system may be constructed in this way.

In addition, an imaging system 100" shown in FIG. 8 includes the above-described restoration coefficient acquisition apparatus 70 and coefficient storage unit 30 provided in a signal processing unit 40". The imaging system may be constructed in this way.

<Performance of an Imaging System>

Next, performance of an imaging system configured to include the imaging lens 10 and the imaging device 20, which are used in the above imaging system 100, will be described.

Figure 9:
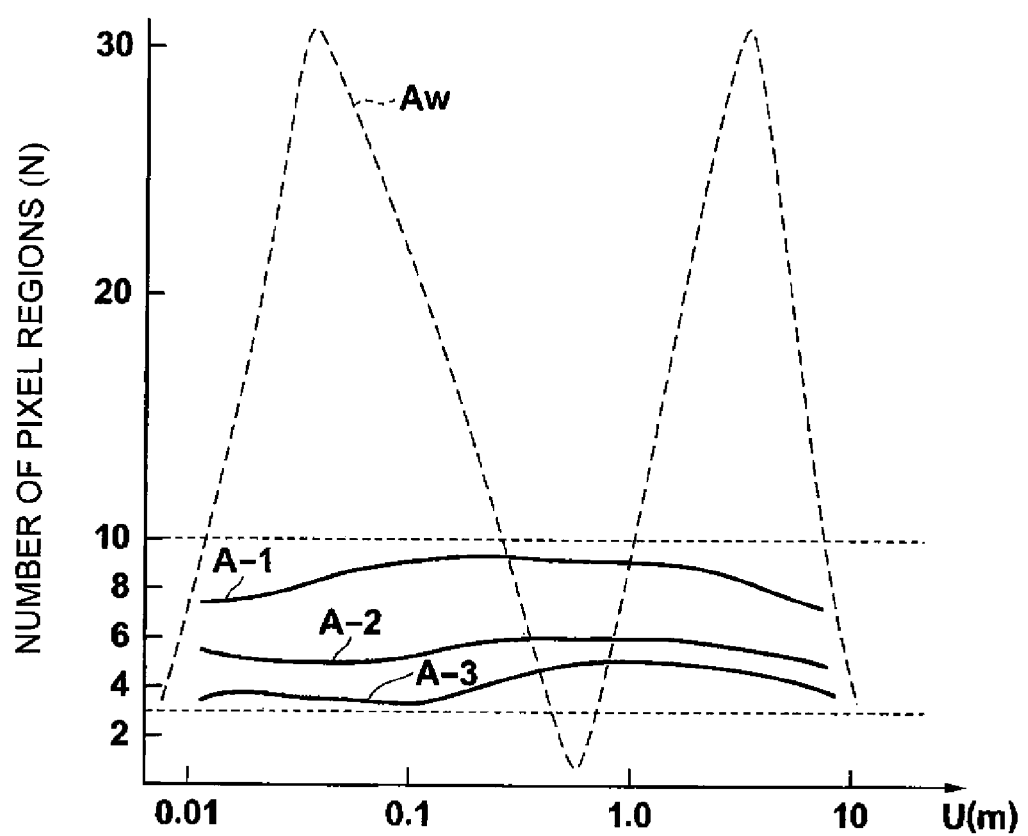
FIG. 9 is a view showing a variation in a maximum diameter of an effective region of a point image, which is an optical image of an object point, projected onto a light receiving surface when the object is moved along the optical-axis direction.

FIG. 9 is a view schematically showing a variation in a maximum diameter of an effective region of a point image, which corresponds to an object point and is projected onto a light receiving surface when the object point is made to move in an optical-axis direction, on the coordinates in which a horizontal axis indicates an optical-axis-direction distance U from an imaging lens to the object point on a logarithmic scale (m) and a vertical direction indicates a length corresponding to the number (N) of pixel regions located continuously on a light receiving surface.

Here, an object point was moved from a position of a near point approximately adjacent to an imaging lens (position adjacent to the imaging lens by about 0.01 m) to a position of a far point approximately infinitely distant from the imaging lens (position distant from the imaging lens by about 10 m).

Three kinds of curves (solid lines) indicated by groups A-1, A-2, and A-3 in FIG. 9 schematically show variations in maximum diameters of effective regions of point images projected onto different specific regions on the light receiving surface 21 through the imaging lens 10 of the imaging system of the invention (specific regions on the light receiving surface having different image heights). In addition, a curved line (dotted line) indicated by a group Aw in FIG. 9 shows a typical variation in a maximum diameter of an effective region of a point image projected onto the light receiving surface through an imaging lens used in a known imaging system (for example, an onboard camera, the camera for cellular phones, a portable cellular phone camera, or a camera for medical apparatus).

As can be seen from FIG. 9, the maximum diameter of an effective region of a point image obtained by projecting an object point onto the light receiving surface 21 largely changes from a size corresponding to one pixel to a size corresponding to thirty pixels according to the movement of the object point in the optical-axis direction.

On the other hand, the maximum diameter of the effective region of the point image obtained by projecting the object point onto the light receiving surface 21 through the imaging lens 10 provided in the imaging system 100 of the invention is a size covering three or more pixels and ten pixels or less in all cases of the groups A-1, A-2, and A-3. That is, there is little fluctuation in the size of the effective region of the point image on the light receiving surface regardless of the distance from the imaging lens 10 to the object point and the position (for example, an image height on the light receiving surface) of the projected point image on the light receiving surface. In addition, also in a point image projected from any position of X, Y, and Z directions onto the light receiving surface through the imaging lens 10, it can be said that a fluctuation in the size of the effective region of the point image is small.

Figure 10:
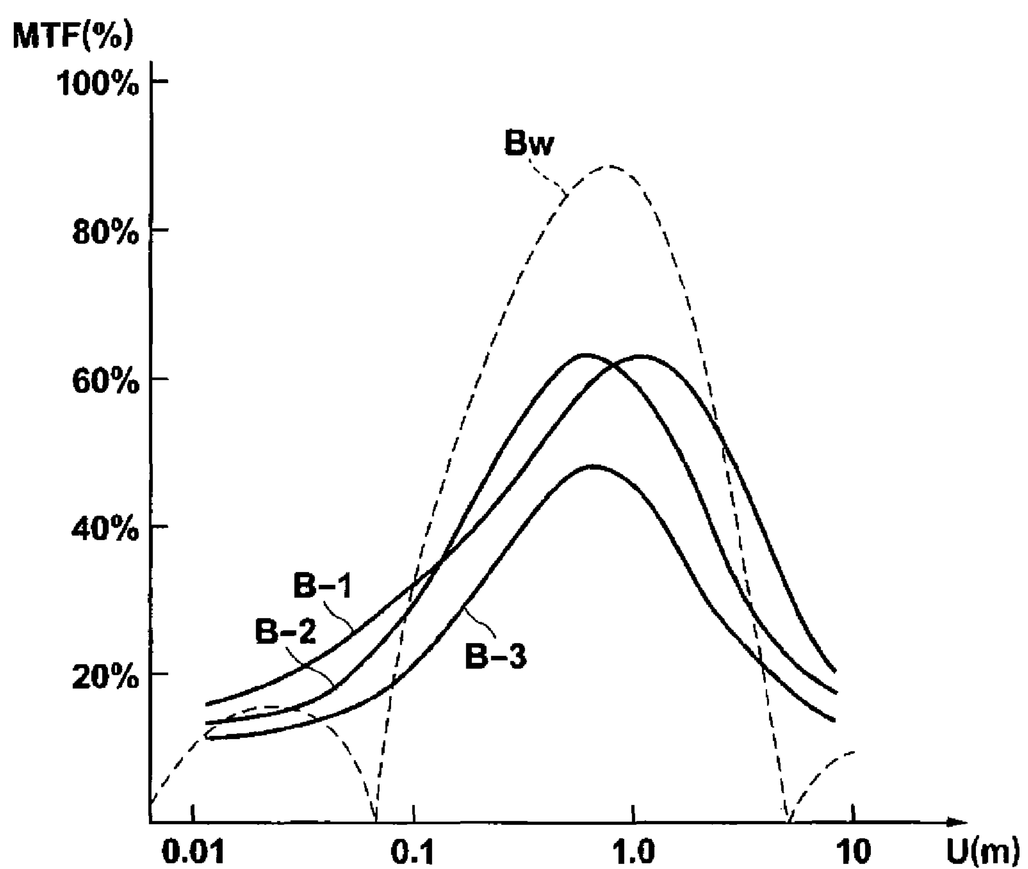
FIG. 10 is a view showing a variation in a value (%) of MTF characteristics regarding an optical image of an object point projected onto a light receiving surface when the object is moved along the optical-axis direction.

FIG. 10 is a view schematically showing a variation of a value (%) of MTF characteristics regarding an optical image of an object point projected onto a light receiving surface when the object point is made to move in an optical-axis direction, on the coordinates in which a horizontal axis indicates an optical-axis-direction distance U from an imaging lens to the object point on a logarithmic scale (m) and a vertical direction indicates the value (%) of MTF characteristics.

Here, an object point was moved from a position of a near point approximately adjacent to an imaging lens (position adjacent to the imaging lens by about 0.01 m) to a position of a far point approximately infinitely distant from the imaging lens (position distant from the imaging lens by about 10 m).

Three kinds of curves (solid lines) regarding the imaging system of the invention indicated by groups B-1, B-2, and B-3 in FIG. 10 schematically show a value (%) of MTF characteristics regarding optical images projected onto different specific regions on the light receiving surface through the imaging lens 10 (specific regions having different image heights). In addition, a curved line (dotted line) indicated by a group Bw in FIG. 10 shows a typical change in a value (%) of MTF characteristics regarding an optical image projected onto a light receiving surface in a known imaging system.

As can be seen from FIG. 10, in a known imaging system, a value (%) of MTF characteristics regarding an optical image projected onto the light receiving surface 21 largely changes from 0% to a value exceeding 80%. In addition, spurious resolution occurs at an object point located in a region (region at which a value of MTF characteristics is turned up from 0%), which is closer to the imaging lens 10 than a position at which a value of MTF characteristics becomes 0%, of a near point where the imaging lens 10 and the object point are adjacent to each other. In addition, the false resolution also occurs at an object point located in a region (region at which a value of MTF characteristics is turned up from 0%), which is more distant than a position at which a value of MTF characteristics becomes 0%, of a far point where the imaging lens 10 and the object point are distant from each other.

On the other hand, the value of MTF characteristics regarding an optical image projected onto the light receiving surface 21 through the imaging lens 10 provided in the imaging system 100 of the invention is a size of 10% or more and 60% or less in any case of the groups B-1, B-2, and B-3, and the spurious resolution does not occur. That is, a fluctuation in a value of MTF characteristics regarding an optical image projected onto a light receiving surface is small and the spurious resolution does not occur regardless of the distance from the imaging lens 10 to an object point and the position (image height) on the light receiving surface of the projected optical image. In addition, it can be said that a fluctuation in the value of the MTF characteristics regarding an optical image projected from any position of X, Y, and Z directions, that is, any position in a three-dimensional space onto the light receiving surface through the imaging lens 10 is also small.

As described above, according to the imaging system of the invention, when the resolution of an image expressed by first image data output from an imaging system does not reach an intended level, it is not necessary to specify the cause and readjust or reassemble the imaging lens unlike the related art. That is, second image data that expresses an image having an intended resolution can be obtained only by storing a restoration coefficient corresponding to a blur state of a point image in a coefficient storage unit and performing restoration processing on the first image data. As a result, the quality of image data obtained by imaging an optical image projected onto the light receiving surface can be easily improved. In addition, it can be said that lack of the resolving power in an imaging system can be recovered easily.

<Method of Manufacturing an Imaging System>

Hereinafter, a method of manufacturing the imaging system of the invention will be described with reference to FIGS. 1, 5, and 6. That is, a method of manufacturing a restoration-coefficient-storage-completed imaging system in which storage of a restoration coefficient is completed by storing an intended restoration coefficient in an imaging system. Here, an imaging system does not have any restoration coefficient originally.

In the method of manufacturing an imaging system, restoration-coefficient-storage-completed imaging systems 100A, 100B, . . . capable of executing restoration processing by storing a restoration coefficient in the coefficient storage unit 30 is manufactured.

In addition, the imaging systems 100A, 100B, . . . are equal to the imaging system 100 already described with reference to FIGS. 1 to 10.

The method of manufacturing an imaging system is a method of manufacturing the imaging systems 100A, 100B, . . . each of which executes restoration processing by using the restoration coefficient K stored in the coefficient storage unit 30 and includes: the imaging lens 10; the imaging device 20 which has the light receiving surface 21 on which a plurality of light receiving pixels are arrayed in a two-dimensional manner and which images an optical image of a subject projected onto the light receiving surface 21 through the imaging lens 10 and outputs the first image data G1 expressing the subject; the signal processing unit 40 that executes the restoration processing F on the first image data G1 in a condition where a pixel region covering total nine pixels including three or more pixels in the vertical direction and three or more pixels in the horizontal direction on the light receiving surface 21 is set as a minimum unit, the restoration processing F being executed to generate the second image data G2 equivalent to the first image data G1 output from the imaging device 20 when the resolving power of the imaging lens 10 is high; and the coefficient storage unit 30 that stores the restoration coefficient K used in the restoration coefficient.

In this manufacturing method, the point image P1 is projected onto the light receiving surface 21 through the imaging lens 10 and the restoration coefficient K corresponding to a state of the point image P1 expressed by the first image data G1 output from the imaging device 20 is stored in the coefficient storage unit 30.

In the method of manufacturing an imaging system, a method of obtaining a restoration coefficient using the restoration coefficient acquisition apparatus 70A of the first example, the restoration coefficient acquisition apparatus 70B of the second example, or the restoration coefficient acquisition apparatus 70C of the third example and storing the restoration coefficient in a coefficient storage unit of each of the imaging systems 100A, 100B, . . . .

Hereinafter, methods of manufacturing imaging systems using the restoration coefficient acquisition apparatus 70A of the first example, the restoration coefficient acquisition apparatus 70B of the second example, and the restoration coefficient acquisition apparatus 70C of the third example will be specifically described. In addition, since configurations and operations of the imaging systems 100A, 100B, . . . , restoration coefficient acquisition apparatus 70A of the first example, restoration coefficient acquisition apparatus 70B of the second example, and restoration coefficient acquisition apparatus C of the third example are similar to those in the imaging system 100, a repeated explanation will be omitted. Accordingly, a method of manufacturing an imaging system not overlapping the explanation on the imaging system 100 will be described.

<Method of Manufacturing an Imaging System Corresponding to the Restoration Coefficient Acquisition Apparatus 70A of the First Example>

In a manufacturing process of "1 to 1" correspondence for storing a restoration coefficient, which is individually calculated for every imaging system, in each imaging system, the following processes are needed.

(1) Point image measurement and determination on uniformity over the projected image on the light receiving surface;

(2) Derivation of a coefficient group (restoration coefficient) applying optimal restoration processing; and (3) Recording of an optimal coefficient group. Each of the functions will be described in more detail.

The process (1) is a function of actually measuring and determining an imaging ability (resolving power) in the combination of each imaging lens and an imaging device. As a means for measuring an optical point image on the basis of an electric signal (first image data) obtained from an imaging device, a DxO analyzer made by DxO Co. in France is commercially available. This uses a concept of expressing blur called B×U that the DxO Co. proposes, which allows to obtain a point image (both an optical point image and a point image after image processing) from an output signal from a digital camera.

Specifically, the DxO analyzer calculates the point image size at an arbitrary point on a light receiving surface of an imaging device by analyzing image data (first image data) obtained by taking an intended designated chart (chart in which a number of black dots are arrayed on white paper) (http://www.dxo.com/jp/image_quality/dxo_analyzer).

In addition, any means for measuring an optical point image may be used as long as the means can calculate a point image from an output signal from a digital camera (that is, an image sensor).

On the other hand, the size of a point image exactly corresponding to an optical design value can be calculated with a tool which designed the optical system. Accordingly, by comparing the size of a "design value point image" obtained in the calculation with the size of a "measured point image" measured in a measuring apparatus, such as the DxO analyzer, it can be determined how far the measured point image deviates from the design value. For example, in many cases, the size of the measured point image becomes larger than the design value because there is an assembly error in an optical component. In addition, the shape or brightness distribution of an effective region of a point image projected onto a light receiving surface of an imaging device is originally symmetrical with respect to a point. However, when the imaging lens is inclined or the axis deviates, the projected image shows foreground blur and background blur, a so-called "single-sided blur state" in the shape or the brightness distribution. Such deviation from a design value can be calculated by comparing the "design value point image" with the "measured point image", and also it is possible to judge whether or not it can be said as the design value may be further made. In addition, even if the design value point image is not considered, it is also possible to define an ideal state arbitrarily, compare the ideal state ("ideal point image") with a "measured point image", and determine the difference.

The process (2) is a step of executing restoration processing based on a kernel Wiener filter and obtaining a coefficient group (restoration coefficient) for making the "measured point image" similar to the "design value point image" or the "ideal point image" by calculation. The Kernel Wiener filter is widely used in a technique of estimating an original signal from an observed signal included in a noise when the original signal is observed together with the noise through intended filtering, as disclosed in the document "title "Kernel Wiener Filter", Yoshikazu Washizawa and Yukihiko Yamashita, 2003 Workshop on Information-Based Induction Sciences, (IBIS2003), Kyoto, Japan, Nov. 11-12, 2003". Here, assuming that the original signal is a "taken object", the filtering is "imaging lens+imaging device", the observed signal is an "image signal (first image data)", and the noise is a "difference between a design value point image (or an ideal point image) and a measured point image", the "taken object" can be estimated by application of the kernel Wiener filter.

If there is no error factor in the "imaging lens+imaging device" of an actual object, a taken object becomes an image signal and an ideal "image signal (second image data)" is theoretically acquired after the restoration processing. Practically, there is a measurement error in the process (1) and a noise component partially remains without being completely removed. However, it is clear that a measured point image becomes similar to a design value point image or an ideal point image, and as a result, the quality of a final image is improved.

Specifically, even if an optical point image is larger than a design value or is not uniform on an imaging surface due to a certain error factor, performance allowable in practical use can be secured by making the point image uniform on the imaging surface or correcting the point image small by restoration processing. In addition, even in an optical system which is obligated to have lower performance (optical point image is large compared with an element pitch) due to cost, size limitation and so on or even there are some error factors in manufacture, the optical performance can be seemingly improved by correcting the point image. By pursuing an improvement in optical performance in appearance, it becomes possible to exceed the theoretical resolution. This is very useful in considering the tendency of miniaturization of a pixel size in recent years.

Here, the theoretical resolution is set as a size of the Airy disk, and a radius Re of an effective region (peak intensity× $(1/e^2)$) of a point image intensity of an ideal lens and a radius Re making the intensity zero are defined by the following expressions. Pixel pitches of latest CMOS devices used as imaging devices are 2.2 microns and 1.75 microns, and it is expected that 1.4 microns and 1.0 microns will be the mainstream from now on. As an example, Re and Rc are calculated as follows in the case of F2.8 and a wavelength of 550 nm.

*Re* (radius of an effective region of a point image intensity)=0.82 λF=0.82×2.8×550×0.001=1.26 microns (diameter of the effective region of the point image intensity=2.52 microns)

*Rc* (radius making the point image intensity zero) =1.22 λF=1.22×2.8×550×0.001=1.88 microns (diameter making the point image intensity zero=3.76 microns).

In this case, the pixel pitch is already over the diffraction limited.

Although non-aberration is assumed in the diffraction limited, the non-aberration is not realized in an actual optical system. Particularly when requests of miniaturization and reduction in cost are considered, the aberration remains rather and accordingly. Therefore, the compromised performance cannot be avoided. The restoration processing using the kernel Wiener filter can improve the quality of a final image up to a practical degree in such a situation.

Although it is assumed that the restoration processing is executed on a specific image surface or at the extreme vicinity (range of foreground blur and background blur), it is also possible to extend the depth of field if restoration processing for eliminating a difference between a measured point image and a design value point image in a number of image surface groups in the defocusing direction corresponding to a variation of the object distance is considered.

Regarding execution of the restoration processing, it is desirable to perform optimal restoration processing for every combination of "imaging lens+imaging device" since a noise component to be removed varies according to each "imaging lens+imaging device". In this case, preferably, the algorithm of restoration processing itself can be the same and a "coefficient group" referred herein is optimal.

The process (3) is a step of actually combining the "optimal coefficient group" with a set of "imaging lens+imaging device". In order to do so, it is necessary to store a coefficient group for executing the optimal restoration processing in an intended recording medium and to add the coefficient group to the set of "imaging lens+imaging device". Accordingly, a recording process is required.

An optical point image is corrected in a form suitable for the application by using an imaging system as a set of "imaging lens+imaging device+recording medium", and an image with satisfactory quality can be obtained eventually. Specifically, even if the resolving power is not satisfactory for a certain reason (manufacturing tolerance and original design value are low), a means capable of obtaining satisfactory resolving power as an image after processing is provided. In addition, a focal depth magnifying means suitable for the characteristics of each set of imaging lens and imaging device may also be provided.

<Method of Manufacturing an Imaging System Corresponding to the Restoration Coefficient Acquisition Apparatus 70B of the Second Example>

A second preferred method of manufacturing the point image correction optical system configured to include an imaging lens, an imaging device, and a signal processing circuit will be described. Here, a case of manufacturing a large number of digital cameras at low cost is assumed. In the manufacturing process, (1) building of a library of a coefficient (restoration coefficient) group used in restoration processing, (2) point image measurement and determination on uniformity over an image, (3) extraction of a coefficient group allowing optimal restoration processing in the unit of a group from the library, and (4) recording of an optimal coefficient group in the unit of a group are needed. Each of the functions will be described in more detail.

In the process (1), an intended number of imaging lenses (for example, 1/10 of all lots) enough to show the overall tendency are measured beforehand and resolution tendencies (malfunction tendencies) are divided into groups. Optimal restoration processing is performed on each of the groups and an optimal coefficient group in the unit of each group is acquired, thereby building a library. Although it is ideal to apply a coefficient group in the "1 to 1" correspondence like the first example, this is not suitable for a case of mass production or a case where cost reduction is needed. Therefore, the library in which the entire part is divided into intended groups and optimal solution is calculated in the group unit is created, like this example.

Although the process (2) is the same as the process (1) in the first example, it is determined that a measured point image will belong to which of the groups acquired in the process (1) in the second example. Practically, for imaging lenses other than the imaging lenses measured at the time of group division, application to a group is also made (for example, 9/10 of all lots).

The process (3) is a step of extracting an optimal coefficient group of the group determined in the process (2) from the library, and the selected coefficient group is applied to the set of "imaging lens+imaging device". In this case, an exact optimal coefficient group for each set of "imaging lens+imaging device" is not considered. Since this shortens the operation time required in the first example, mass production can be realized at low price.

The process (4) is the same as the process (3) in the first example.

<Method of Manufacturing an Imaging System Corresponding to the Restoration Coefficient Acquisition Apparatus 70C of the Third Example>

A third preferred method of manufacturing the point image correction optical system configured to include an imaging lens, an imaging device, and a signal processing circuit will be described. Here, a case of manufacturing a large number of digital cameras at low cost is assumed. In the manufacturing process, (1) building of a library of a coefficient (restoration coefficient) group used in restoration processing, (2) point image measurement and determination on uniformity over an image, (3) extraction of a coefficient group allowing optimal restoration processing from the library, (4) partial modification of the corresponding coefficient group, and (5) recording of the modified coefficient group are needed. Each of the functions will be described in more detail.

The processes (1), (2), and (3) are the same as the processes (1), (2), and (3) in the second example.

The process (4) is a process of partially modifying the coefficient group extracted. Although the coefficient group is an arrangement of certain numbers, a modification needed for certain "imaging lens+imaging device" is made by correcting only a part thereof. Since coefficients are partially modified unlike the first example in all coefficient groups are optimized, the modification is completed in a short time.

The process (5) is a step of recording the corrected coefficient group that has been modified, and a set of "imaging lens+imaging device+recording medium" is thus formed.

Thus, the imaging system manufactured by using the method of manufacturing an imaging system of the invention can easily improve the quality of image data obtained by imaging an optical image projected onto a light receiving surface.

<Modification of each Constituent Element>

Hereinafter, modifications of constituent elements in the imaging system and the method of manufacturing an imaging system will be described.

In addition, the signal processing unit may execute the restoration processing with a pixel region, which includes the whole effective region but is not the minimum, as a minimum unit without being limited to a case where the restoration processing is executed in a condition where a minimum pixel region including the entire effective region of a point image projected onto a light receiving surface is set as a minimum unit.

Furthermore, the signal processing unit may execute the restoration processing such that the size of an effective region of a point image in an image expressed by first image data is equal to or larger than the size of an effective region of a point image in an image expressed by second image data without being limited to a case where the restoration processing is executed such that the size of the effective region of the point image in the image expressed by the second image data is smaller than the size of the effective region of the point image in the image expressed by the first image data.

In addition, in the imaging system, the imaging lens and the imaging device may be constructed such that the maximum diameter of an effective region of a point image, which is projected onto a light receiving surface from any position of X, Y, and Z directions of an object space within a range which is restricted to, for example, 10f or more in the Z direction and is restricted up to an intended object height in the X and Y directions, becomes a size covering three or more pixels of light receiving pixels which form the light receiving surface of the imaging device.

In addition, the imaging lens is preferably constructed such that a value of MTF characteristics of an optical image of a subject, which is projected onto a light receiving surface through the imaging lens from any position of X, Y, and Z directions distant ten times or more of a focal distance of the imaging lens, is a positive value. In addition, the "position distant ten times or more of a focal distance of an imaging lens" means a "position distant ten times or more of the focal distance toward the subject along the optical-axis direction (Z-axis direction) of the imaging lens from a reference position when a position, at which one of lens surfaces forming the imaging lens closest to the subject side (object side) and the optical axis of the imaging lens cross each other, is set as the reference position".

Moreover, in apparatuses requested to have a large depth of field, such as an imaging apparatus, a portable terminal apparatus, an onboard apparatus, and a medical apparatus of the invention including the above-described imaging system, the quality of image data obtained by imaging an optical image projected onto the light receiving surface of the imaging system provided in each apparatus can be easily improved as described above.

Figure 11:
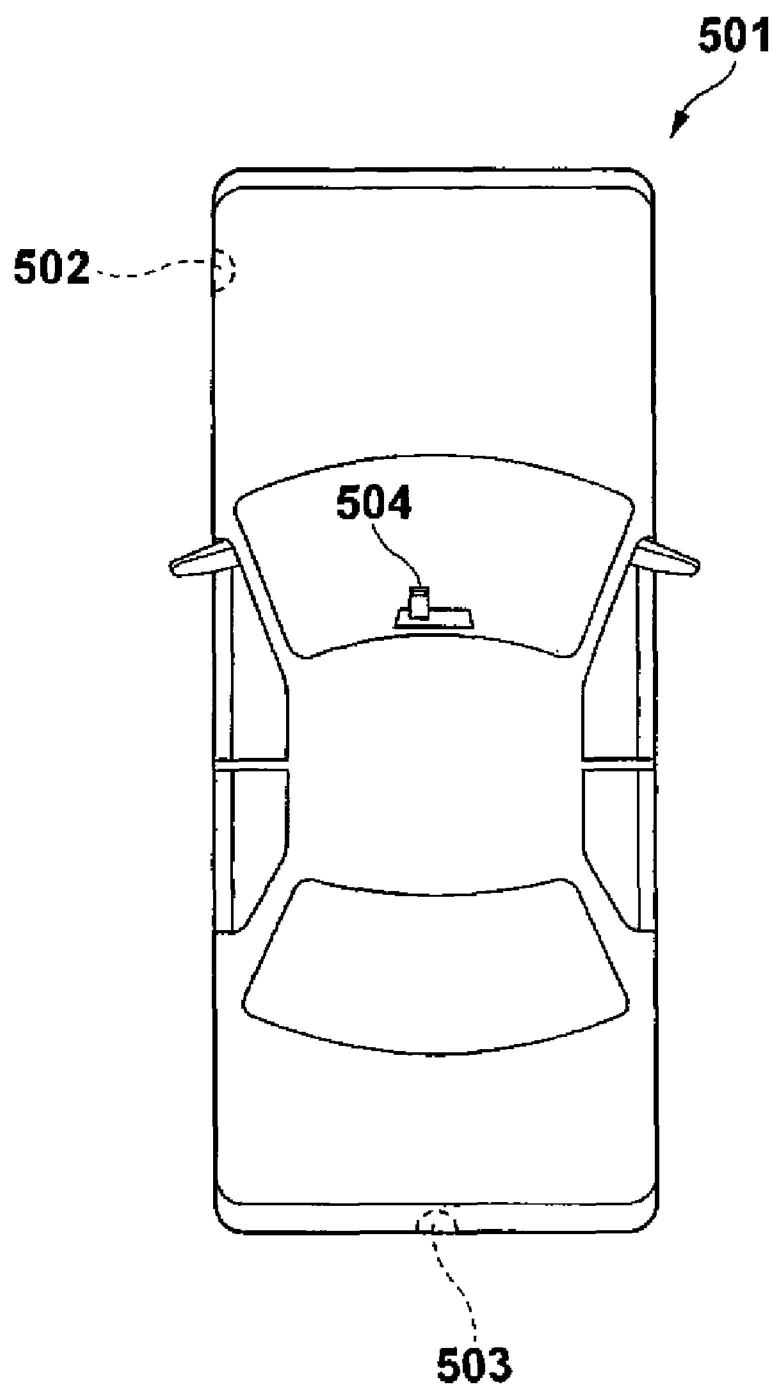
FIG. 11 is a view showing an automobile in which an onboard apparatus including an imaging system is mounted.

FIG. 11 is a view showing an automobile in which an onboard apparatus including an imaging system is mounted.

As shown in FIG. 11, onboard apparatuses 502 to 504 each including the imaging system of the invention may be used in a state mounted in an automobile 501 and the like. The automobile 501 includes: the onboard apparatus 502 which is a camera provided outside the vehicle in order to image a blind zone of a side surface on a front passenger side; the onboard apparatus 503 which is a camera provided outside the vehicle in order to image a blind zone on a rear side of the automobile 501; and the onboard apparatus 504 which is a camera attached to a back surface of a room mirror and provided inside the vehicle in order to image the same viewing field range as a driver.

Figure 12:
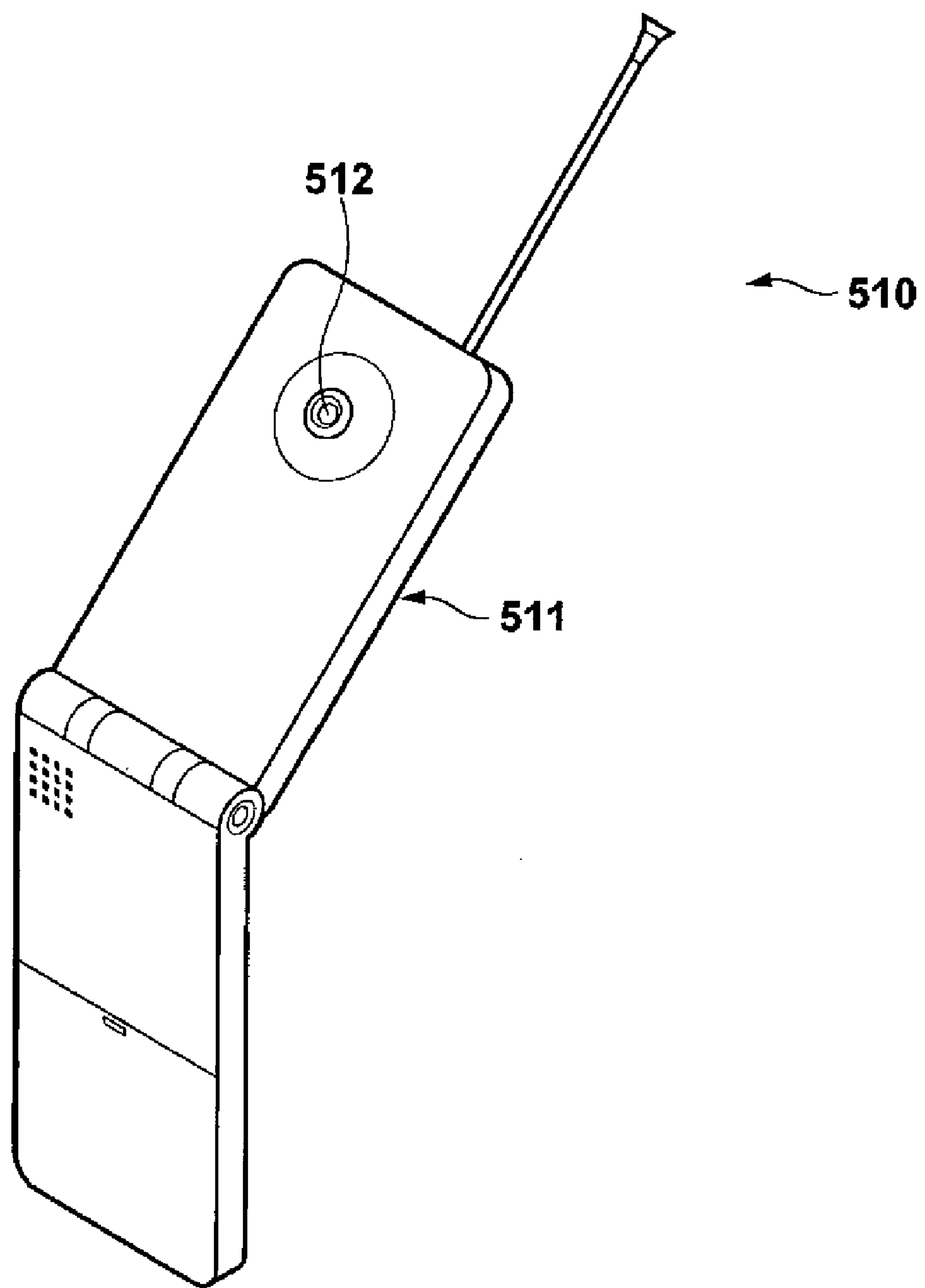
FIG. 12 is a view showing a portable cellular phone which is a portable terminal apparatus including an imaging system.

FIG. 12 is a view showing a portable cellular phone which is a portable terminal apparatus including an imaging system.

As shown in the drawing, a portable cellular phone 510 has an imaging system 512 provided in a housing 511 of the portable cellular phone.

Figure 13:
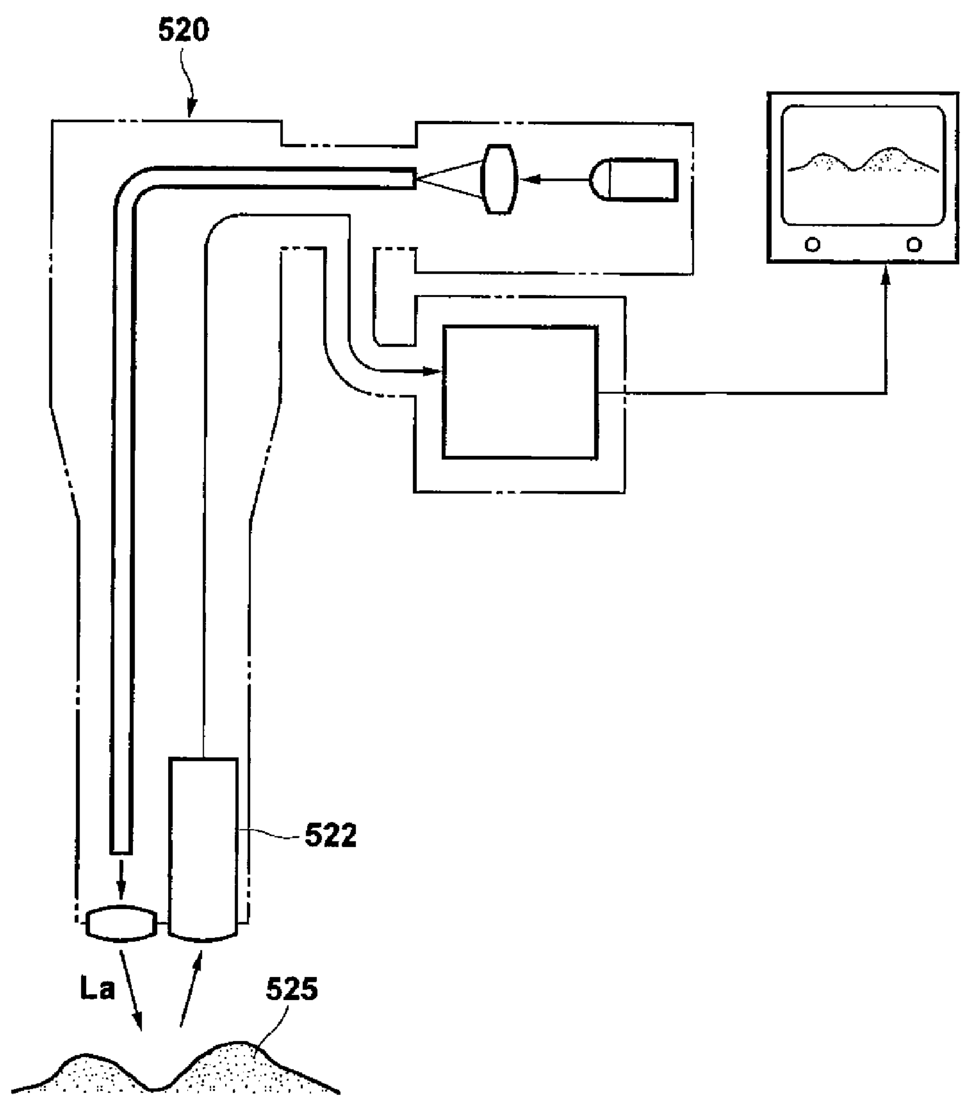
FIG. 13 is a view showing an endoscope apparatus which is a medical apparatus including an imaging system.

FIG. 13 is a view showing an endoscope apparatus which is a medical apparatus including an imaging system.

As shown in the drawing, an endoscope apparatus 520 that observes a biological tissue 525 has an imaging system 522, which is used to image the biological tissue 525 illuminated by illumination light La, provided on a front end 521 of the endoscope apparatus 520.

Thus, in the imaging apparatus, the portable terminal apparatus, the onboard apparatus, and the medical apparatus of the invention including the above-described imaging system, a known imaging system provided in an imaging apparatus, a portable terminal apparatus, an onboard apparatus, and a medical apparatus known from the past may be easily replaced. That is, the imaging apparatus, the portable terminal apparatus, the onboard apparatus, and the medical apparatus of the invention may be constructed by replacing the known imaging systems provided in the known apparatuses with the imaging system of the invention without changing the apparatus size, shape, and the like of the imaging apparatus, portable terminal apparatus, onboard apparatus, and medical apparatus known from the past.

In addition, the imaging system of the invention may also be constructed such that the maximum diameter of an effective region only in a point image, which is projected onto a light receiving surface through an imaging lens from a position at which the imaging lens and the imaging device are limited in at least one of the X, Y, and Z directions, becomes a size covering three or more pixels of light receiving pixels which form the light receiving surface. In such a case, the second image data may be obtained by executing the restoration processing only on the first image data indicate a region where the maximum diameter of an effective region of a point image projected onto the light receiving surface is a size covering three or more pixels of light receiving pixels.

Furthermore, the imaging system may be constructed such that an optical image of a subject is projected onto a light receiving surface only through an optical member having an axisymmetric shape or the optical image of the subject is projected onto the light receiving surface through an optical member having a non-axisymmetric shape. In addition, it is preferable that the imaging lens have a large depth of field. That is, it is preferable to construct the imaging lens and the imaging device such that a change in a blur state of a point image projected onto a light receiving surface is decreased even if a change in a state where an optical image of a subject is projected onto the light receiving surface occurs due to the movement of the subject or focus adjustment of the imaging lens, for example. More specifically, it is preferable to construct the imaging lens and the imaging device such that changes in size and contrast of the effective region of the point image projected onto the light receiving surface are decreased. However, the imaging system may also be made to include an imaging lens having a small depth of field without being limited to a case in which the imaging system includes an imaging lens having a large depth of field.

In addition, the imaging device used in the above-described imaging system may be a CCD device or a CMOS device.

What is claimed is:

1. An imaging system comprising:

an imaging lens;

an imaging device that has a light receiving surface on which a plurality of light receiving pixels are two-dimensionally arrayed and that forms first image data based on an optical image of a subject projected onto the light receiving surface through the imaging lens and outputs the first image data corresponding to the subject;

a coefficient storage section that will store a restoration coefficient corresponding to a state of a point image, which is projected onto the light receiving surface through the imaging lens and is expressed by the first image data output from the imaging device, when a maximum diameter of an effective region of the point image is a size covering three or more pixels; and a signal processing section that executes restoration processing on the first image data by utilizing the restoration coefficient, the restoration processing being executed to generate second image data equivalent to the first image data output from the imaging device when a resolving power of the imaging lens is higher, wherein the signal processing section executes the restoration processing in a condition where a pixel region covering total nine or more pixels including three or more pixels in a vertical direction and three or more pixels in a horizontal direction on the light receiving surface is set as a minimum unit, wherein the coefficient storage section will store a correction-completed restoration coefficient obtained by further correction of the restoration coefficient according to a state of the point image expressed by the first image data, the restoration coefficient being selected corresponding to the state of the point image among candidates of a plurality of types of restoration coefficients corresponding to respective states of point images classified into a plurality of types.

2. The imaging system according to claim 1, wherein the coefficient storage section will store the restoration coefficient individually calculated for each corresponding imaging system.

3. The imaging system according to claim 1, wherein the coefficient storage section will store the restoration coefficient which is selected corresponding to a state of the point image expressed by the first image data among candidates of restoration coefficients corresponding to respective states of point images classified into a plurality of types.

4. The imaging system according to claim 1, further comprising: a restoration coefficient acquisition section that acquires the restoration coefficient and stores the acquired restoration coefficient in the coefficient storage section.

5. The imaging system according to claim 1, wherein the signal processing section executes the restoration processing with a minimum pixel region which includes an entire effective region of the point image projected onto the light receiving surface, as a minimum unit.

6. The imaging system according to claim 1, wherein the signal processing section executes the restoration processing such that a size of an effective region of the point image in an image expressed by the second image data is smaller than a size of an effective region of the point image in an image expressed by the first image data.

7. An imaging apparatus comprising an imaging system according to claim 1.

8. A portable terminal apparatus comprising an imaging system according to claim 1.

9. An onboard apparatus comprising an imaging system according to claim 1.

10. A medical apparatus comprising an imaging system according to claim 1.

11. A method for manufacturing an imaging system that includes:

an imaging lens;

an imaging device that has a light receiving surface on which a plurality of light receiving pixels are two-dimensionally arrayed and that forms first image data based on an optical image of a subject projected onto the light receiving surface through the imaging lens and outputs the first image data corresponding to the subject;

a coefficient storage section that stores a restoration coefficient corresponding to a state of a point image, which is projected onto the light receiving surface through the imaging lens and is expressed by the first image data output from the imaging device, when a maximum diameter of an effective region of the point image is a size covering three or more pixels; and a signal processing section that executes restoration processing on the first image data by utilizing the restoration coefficient, the restoration processing being executed to generate second image data equivalent to the first image data output from the imaging device when a resolving power of the imaging lens is higher, wherein the signal processing section executes the restoration processing in a condition where a pixel region covering total nine or more pixels including three or more pixels in a vertical direction and three or more pixels in a horizontal direction on the light receiving surface is set as a minimum unit, the method comprising projecting the point image onto the light receiving surface of the imaging device through the imaging lens to cause the coefficient storage section to store the restoration coefficient corresponding to a state of the point image expressed by the first image data output from the imaging device, wherein the coefficient storage section will store a correction-completed restoration coefficient obtained by further correction of the restoration coefficient according to a state of the point image expressed by the first image data, the restoration coefficient being selected corresponding to the state of the point image among candidates of a plurality of types of restoration coefficients corresponding to respective states of point images classified into a plurality of types.

12. The method of manufacturing an imaging system according to claim 11, wherein the restoration coefficient is individually calculated for each corresponding imaging system.

13. The method of manufacturing an imaging system according to claim 11, wherein the restoration coefficient is selected corresponding to a state of the point image expressed by the first image data among candidates of each restoration coefficient corresponding to each of states of point images classified into a plurality of types.

14. The method of manufacturing an imaging system according to claim 12, wherein the restoration coefficient is obtained by further correction of the restoration coefficient according to a state of the point image expressed by the first image data, the restoration coefficient being selected corresponding to the state of the point image among candidates of a plurality of types of restoration coefficients corresponding to respective states of point images classified into a plurality of types.

* * * * *